United States Patent
Lyle

(10) Patent No.: US 11,610,273 B2
(45) Date of Patent: Mar. 21, 2023

(54) ENTERPRISE-WIDE PROCESS STREAM ANALYSIS AND GRADING ENGINE WITH INTERACTIVE USER INTERFACE METHOD, SYSTEM, AND COMPUTER PROGRAM PRODUCT

(71) Applicants: Michael A. Lyle, Fairfax, VA (US); InfinityQS International, Inc., Fairfax, VA (US)

(72) Inventor: Michael A. Lyle, Boulder, CO (US)

(73) Assignee: InfinityQS International, Inc., Fairfax, VA (US)

( * ) Notice: Subject to any disclaimer, the term of this patent is extended or adjusted under 35 U.S.C. 154(b) by 311 days.

(21) Appl. No.: 15/963,975

(22) Filed: Apr. 26, 2018

(65) Prior Publication Data

US 2019/0333165 A1    Oct. 31, 2019

(51) Int. Cl.
*G06Q 50/04* (2012.01)
*G06Q 10/06* (2012.01)
(Continued)

(52) U.S. Cl.
CPC ....... *G06Q 50/04* (2013.01); *G06Q 10/06393* (2013.01); *G06F 3/0481* (2013.01); *G06F 16/24568* (2019.01)

(58) Field of Classification Search
CPC .................. G06Q 50/04; G06Q 10/06393
(Continued)

(56) References Cited

U.S. PATENT DOCUMENTS

| | | | |
|---|---|---|---|
| 4,623,837 A | 11/1986 | Efron | |
| 4,931,933 A * | 6/1990 | Chen | G06Q 10/087 705/28 |

(Continued)

FOREIGN PATENT DOCUMENTS

| | | | | |
|---|---|---|---|---|
| EP | 3387448 A1 * | 10/2018 | ....... | G05B 19/41875 |
| WO | WO-2017031190 A1 * | 2/2017 | ....... | G06Q 10/06393 |

OTHER PUBLICATIONS

Lee, Rosita; Choosing your Risk Matrix model; Sep. 6, 2015 (Year: 2015).*

(Continued)

*Primary Examiner* — Brian M Epstein
*Assistant Examiner* — Kristin E Gavin
(74) *Attorney, Agent, or Firm* — Reston Law Group, LLP; Ralph P. Albrecht

(57) ABSTRACT

A cloud-based process stream analysis and grading engine for manufacturing and business applications. As a module contained within a comprehensive manufacturing quality suite, the grading engine functions are divided into two stages. For each unique part/process/feature data stream, Stage one automatically generates and stores a daily statistical summary record. These records are summarized from millions of raw data values fed into the engine across thousands of process streams. Stage two, the grading function, compares a user-specified time bounded analysis of each stream's summary history to the respective engineering specifications, resulting in a concatenated dual character grade—a letter and a number. There are a total of nine possible grade outcomes (A1, A2, A3, B1, B2, B3, C1, C2, and C3). The ABC portion of the grade ranks the Yield Potential. The 123 portion ranks the Yield Performance. The grades are reported to the users on the Grading Matrix tile (Continued)

and/or Site Summary tile contained within a built-in dashboard.

22 Claims, 16 Drawing Sheets

(51) Int. Cl.
*G06F 3/0481* (2022.01)
*G06F 16/2455* (2019.01)
*G06Q 10/0639* (2023.01)

(58) Field of Classification Search
USPC .......................................................... 705/7.39
See application file for complete search history.

(56) References Cited

U.S. PATENT DOCUMENTS

| | | | |
|---|---|---|---|
| 5,126,990 A | 6/1992 | Efron | |
| 5,155,677 A | 10/1992 | Kurtzberg et al. | |
| 5,225,998 A | 7/1993 | Singhal | |
| 5,438,527 A | 8/1995 | Feldbaumer | |
| 5,668,634 A | 9/1997 | Newman et al. | |
| 5,956,251 A | 9/1999 | Atkinson et al. | |
| 6,210,983 B1 | 4/2001 | Atkinson | |
| 6,542,830 B1 | 4/2003 | Mizuno | |
| 6,687,558 B2 | 2/2004 | Tuszynski | |
| 6,766,283 B1 | 7/2004 | Goldman et al. | |
| 6,915,172 B2 | 7/2005 | Parent et al. | |
| 7,039,632 B2 | 5/2006 | McCormick | |
| 7,123,980 B2 | 10/2006 | Funk | |
| 7,380,213 B2 | 5/2008 | Pokorny et al. | |
| 7,580,767 B2 | 8/2009 | MacDonald et al. | |
| 7,672,745 B1 | 3/2010 | Tuszynski | |
| 7,809,459 B2 | 10/2010 | Morisawa et al. | |
| 9,069,345 B2 | 6/2015 | McCready et al. | |
| 9,275,356 B2 | 3/2016 | Popp | |
| 9,378,197 B1 | 6/2016 | Ghanem | |
| 9,438,648 B2 | 9/2016 | Asenjo et al. | |
| 2002/0026257 A1* | 2/2002 | Newmark | G05B 19/41805 700/51 |
| 2002/0059093 A1* | 5/2002 | Barton | G06Q 10/06393 705/7.39 |
| 2003/0033040 A1 | 2/2003 | Billings | |
| 2003/0130806 A1 | 7/2003 | Mizuno | |
| 2003/0150908 A1* | 8/2003 | Pokorny | G05B 13/0285 235/375 |
| 2004/0068431 A1* | 4/2004 | Smith | G06Q 10/10 705/7.14 |
| 2005/0010546 A1 | 1/2005 | Nowotny et al. | |
| 2006/0184264 A1 | 8/2006 | Willis | |
| 2008/0195359 A1 | 8/2008 | Barker | |
| 2011/0061013 A1* | 3/2011 | Bilicki | G06Q 10/06393 715/771 |
| 2012/0026478 A1 | 2/2012 | Chen | |

OTHER PUBLICATIONS

Lee, Rosita; Choosing you Risk Matrix model; Sep. 6, 2015 (Year: 2015).*

Rahani, A.R., Muhammad al-Ashraf, Production Flow Analysis through Value Stream Mapping: A Lean Manufacturing Process Case Study, 2012, Procedia Engineering, vol. 41, pp. 1727-1734 (Year: 2012).*

Rahani, A.R., al-Ashraf, Muhammad, Production Flow Analysis through Value Stream Mapping: A Lean Manufacturing Process Case Study, 2012, Procedia Engineering, vol. 41, pp. 1727-1734 (Year: 2012).*

Arthur, Jay, "Six Sigma Simplified, Breakthrough Improvement Made Easy," https://www.qimacros.com/pdf/sixsigma, 3rd. Ed., pp. 77-79.

* cited by examiner

| | Grading 704 | | Minimum Yield 706 | Maximum Yield 708 | Definitions 710 |
|---|---|---|---|---|---|
| Yield Potential (centered process) 712 | A | High | 99.990% | 100.000% | Good Technology |
| | B | Moderate | 99.730% | 99.990% | Satisfactory Technology, Consider Maintenance |
| | C | Low | 0.000% | 99.730% | Poor Technology, Technology Update or Maintenance Required |
| Yield Performance 714 | A | High | 95.000% | 100.000% | Effective Operations |
| | B | Moderate | 90.000% | 95.000% | Satisfactory Operations, Consider Additional Training |
| | C | Low | 0.000% | 90.000% | Ineffective Operations, Additional Training Required |

ENTERPRISE-WIDE PROCESS STREAM ANALYSIS AND GRADING ENGINE WITH INTERACTIVE USER INTERFACE METHOD, SYSTEM, AND COMPUTER PROGRAM PRODUCT

BACKGROUND OF THE DISCLOSURE

Field of the Disclosure

The disclosure relates generally to automated quality measurement systems, and more particularly to automated electronic manufacturing quality measurement systems.

Related Art

Businesses that manufacture physical goods, rely on procedures and systems to verify that the quality of the products that the businesses produce, meet intended expectations. This quality verification process typically involves comparing critical to quality part features of manufactured parts, to respective engineering specification limits of the part features. Because most manufacturing processes produce the same products over extended periods of time, these measurements need to be taken on a regular basis, typically several times a day, to ensure the processes are performing as expected. These measurements are also used to detect when corrective actions need to be taken.

Because of the number of measurements used to verify quality, summary statistics are used to analyze the quality data. The two most common statistics conventionally used to report a part feature's quality are $C_{pk}$ and $P_{pk}$. In short, the $C_{pk}$ is a ratio based on short-term standard deviation that describes how well the distribution of the process output (for a given part and feature) meets the specification limit requirements. The $P_{pk}$ ratio is identical to the $C_{pk}$, except that the $P_{pk}$ ratio uses long-term standard deviation in the computation. The $C_{pk}$ and $P_{pk}$ ratios do a good job helping manufacturing quality professionals, which work closely with the processes, know which part/process/feature combinations are performing well and which ones are problematic.

From a reporting perspective, however, there are several inherent weaknesses, or shortcomings of these $C_{pk}$ and $P_{pk}$ ratios, including:

1. The $C_{pk}$ and $P_{pk}$ ratios are understood by only a limited number of people;
2. The $C_{pk}$ and $P_{pk}$ ratios report how good or bad a process is, but they do not provide any visibility into the type of corrective action needed; and
3. Because the $C_{pk}$ and $P_{pk}$ ratios focus on single streams, they are not good enterprise level comparative metrics.

Conventional underlying statistics used to report on quality need to be retooled to better support enterprise-wide decisions and quality improvement activities. What is needed for manufacturers, is more automated, dashboard driven data about manufacturing quality.

Therefore, what is needed in an automated system that overcomes shortcomings of conventional solutions.

SUMMARY OF THE DISCLOSURE

Various example embodiments or exemplary embodiments of the present invention are set forth below in the accompanying disclosure. The present disclosure incorporates a number of known technologies into a useful, novel and nonobvious system, method and nontransitory computer accessible medium program product containing logic, which when executed by a computer processor is configured to perform various advantageous features and functions including features that automatically electronically grade, via a computerized electronic computational engine, and automatically display via an interface, preferably a graphical user interface, a manufacturing process stream or streams, according to example embodiments.

A process stream grading engine, according to an exemplary embodiment addresses a need for an intuitive dashboard designed to address shortcomings of conventional quality statistic data analysis and measurement systems. Top executives, plant managers, and department leads conventionally need access to quick analysis from millions of data records along with automated decision-making guidance. An exemplary, highly efficient, cloud-based quality analysis engine coupled with an innovative combination of proven statistics, according to exemplary embodiments can be used to help manufactures isolate and correct process deficiencies while also showcasing those processes that are performing well.

More particularly, exemplary embodiments of the present invention may include, e.g., but not limited to, a computer implemented method, system, and/or nontransitory computer readable medium for automatically computationally grading and displaying via an electronic display and a graphical user interface coupled to at least one computer processor and at least one memory device coupled to the at least one computer processor, the method comprising: electronically receiving, by the at least one computer processor, at least one quality characteristic measurement data about at least one manufacturing process stream, via at least one of: at least one electronic keyboard or other input device; or at least one electronic sensor gauge; or at least one automated electronic data acquisition sensor configured to operate without any user intervention; electronically time stamping, by the at least one computer processor, said at least one quality characteristic measurement data, comprising: electronically transforming, by the at least one computer processor, said at least one quality characteristic data into at least one time-stamped quality characteristic measurement data; and electronically storing, by the at least one computer processor, said at least one time-stamped quality characteristic measurement data to the at least one memory; electronically analyzing, by the at least one computer processor, a plurality of said at least one time-stamped quality characteristic measurement data, comprising: electronically grading, by the at least one computer processor, said plurality of said at least one time-stamped quality characteristic measurement data comprising electronically transforming said plurality into at least one grade, wherein said at least one grade comprises at least two metrics, wherein said at least two metrics comprise: a yield potential letter grade comprising one of: a high letter grade, a moderate letter grade, or a low letter grade; and a yield performance numeric grade comprising one of: a high numeric grade, a moderate numeric grade, or a low numeric grade; and electronically displaying, by the at least one computer processor, via the graphical user interface and the electronic display said at least one grade comprising said at least two metrics.

According to an exemplary embodiment, the method can further include: storing, by the at least one computer processor, said at least one time-stamped quality characteristic measurement data into at least one database; and organizing, by the at least one computer processor, said at least one time-stamped quality characteristic measurement data into at least one unique stream of said at least one manufacturing process streams, wherein said at least one unique stream of said at least one manufacturing process streams is identified by at least three primary tags, wherein said at least three primary tags comprise at least one of: a part tag, a process tag, or a feature tag.

According to an exemplary embodiment, the method can further include: wherein every 24 hours, a summarizing engine can include: automatically querying, by the at least one processor, an entire system, and determining any new data that have been written to the at least one database relating to said at least one manufacturing process streams; and generating, by the at least one processor, and writing, by the at least one processor, at least one summary record for each of said at least one unique of said at least one manufacturing process streams that was determined to contain said any new data, from the previous 24 hours.

According to an exemplary embodiment, the method can include: wherein said generating said at least one summary record comprises: computing a plurality of statistics comprising: automatically calculating, by the at least one processor of said summarizing engine, one or more of at least one of: a piece count, a subgroup count, a mean, a standard deviation long-term, or a standard deviation short-term.

According to an exemplary embodiment, the method can include: a stream grading engine method comprising: using, by said at least one processor, said plurality of statistics contained within said at least one summary record comprising: calculating, by said at least one processor, a yield grade for each process stream.

According to an exemplary embodiment, the method can include: wherein said grading said yield potential letter grade can include: wherein said high letter grade comprises an A, wherein said moderate letter grade comprises a B, and wherein said low letter grade comprises a C, and wherein said grading said yield potential letter grade comprises: comparing, by the at least one computer processor said short-term standard deviation of said at least one manufacturing process streams, to an upper specification limit, and a lower specification limit.

According to an exemplary embodiment, the method can include: wherein said grading said yield performance numeric grade can include: wherein said high numeric grade comprises a 1, wherein said moderate numeric grade comprises a 2, and wherein said low numeric grade comprises a 3, and wherein said grading said yield performance numeric grade comprises: calculating, by the at least one computer processor, a ratio between an expected yield and a potential yield, and wherein an expected yield comprises: comparing, by the at least one computer processor, a mean and a long-term standard deviation of said at least one manufacturing process stream, to an upper specification, and a lower specification.

According to an exemplary embodiment, the method can further include: for each of said at least one manufacturing process streams, a computed grade provides insight into how well said at least one manufacturing process is performing, as compared to a potential performance for said at least one manufacturing process.

According to an exemplary embodiment, the method can further include: for each unique quality feature, wherein the grading engine method comprises: generating, by the at least one computer processor, an overall grade for a physical manufacturing site.

According to an exemplary embodiment, the method can further include: presenting as output, by the at least one computer processor, a grading matrix as a presentation layer of nine grades, wherein said grading matrix comprises: a 3×3 grid, and wherein a top of said 3×3 grid has columns labeled with 123 across the top, and wherein a left side of said 3×3 grid has rows labeled with ABC down the left side, and wherein each cell in said 3×3 matrix comprises a value of a number of said at least one manufacturing process streams, that are assigned to a corresponding letter and a corresponding numeric grade.

According to an exemplary embodiment, the method can include: wherein upon receiving, by the at least one processor, of input of a user selection of a number within a grade cell, within said grading matrix, displaying a detailed list of said at least one manufacturing process streams that meet a grade associated with the received user selection.

According to an exemplary embodiment, the method can further include: presenting as output, by the at least one computer processor, a site summary comprising a presentation layer comprising: displaying, by the at least one computer processor, a two axis matrix comprising a plurality of feature names across a top axis, and a plurality of site names down the left side axis, and wherein within each given cell of a plurality of cells of said two axis matrix comprises a rolled up grade for an associated selected of said feature name and said site name combination, and wherein said each given cell of said plurality of cells is color-coded based on an associated grade represented in said each given cell.

According to an exemplary embodiment, the method can further include: receiving, by the at least one computer processor, a user selection of a grade cell to view within said site summary, and displaying, by the at least one computer processor, said grade cell of said user selection comprising: displaying a detailed list of a plurality of processes within said site of said grade cell of said user selection that produced a given feature.

BRIEF DESCRIPTION OF THE DRAWINGS

FIG. 7 depicts an illustrative display of an example output chart including an exemplary graphical user interface of an exemplary user interface matrix chart showing exemplary upper (maximum yield) and lower (minimum yield) yield thresholds of exemplary three level grading, according to an exemplary embodiment, i.e., grading heading and exemplary grading A, B, C alpha yield potential grades (exemplary but nonlimiting three levels), and 1, 2, 3 numeric yield performance grading ranks (exemplary but nonlimiting three levels), and associated exemplary high, moderate, and low ranges associated with both the alpha and the numeric grades, respectively, according to an exemplary embodiment of the invention;

FIGS. 9 and 10 is an illustration of the Stream Analysis Table showing that summary rows can be rolled down to view the individual streams, and to reveal further details of underlying data, previously aggregated, via user selection of the user interface interaction, according to an exemplary embodiment of the invention;

DETAILED DESCRIPTION OF VARIOUS EXEMPLARY EMBODIMENTS OF THE DISCLOSURE

Figure 1:
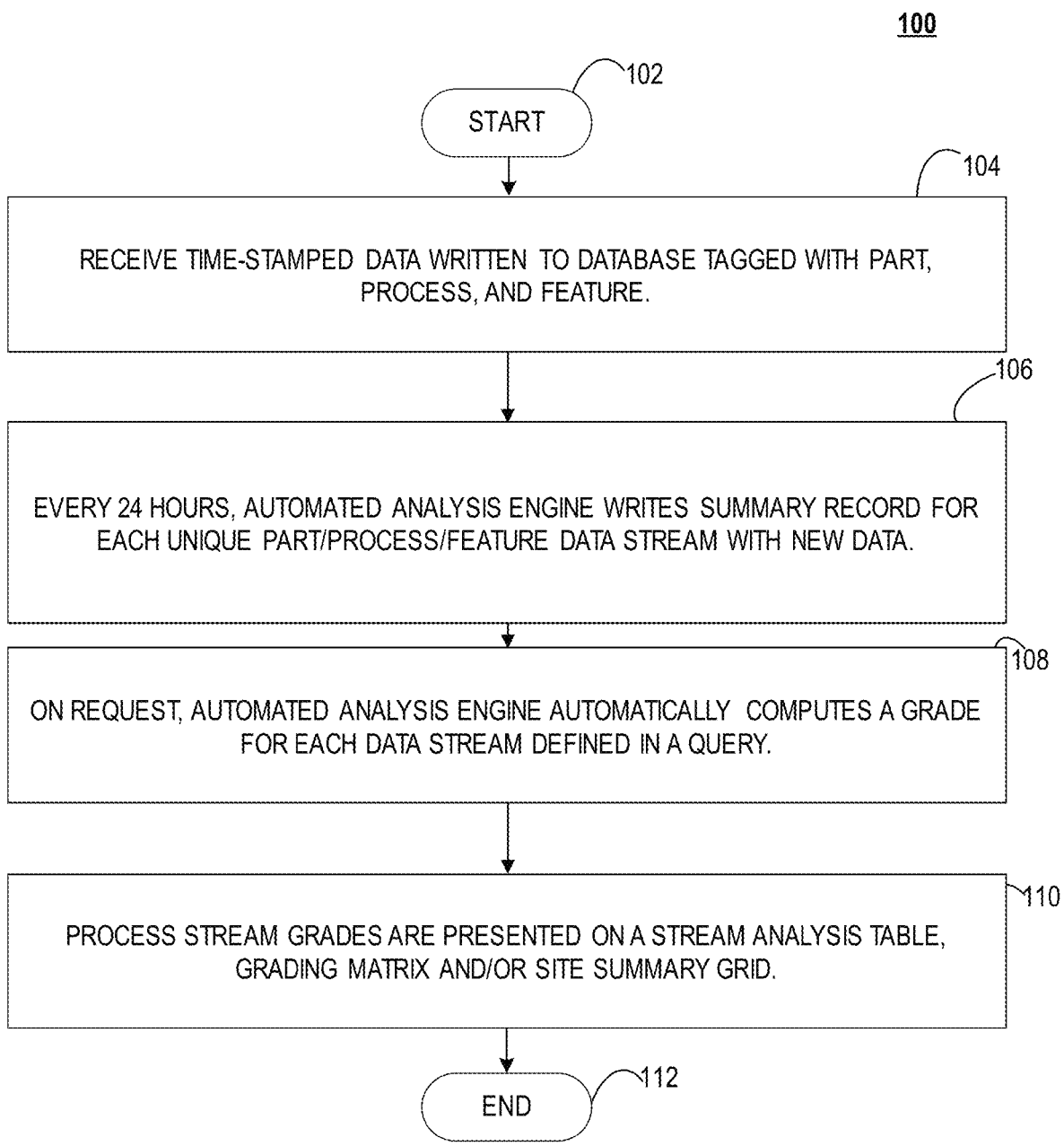
FIG. 1 is a high-level flow diagram of example major process stream grading steps, according to an exemplary embodiment of the invention.

FIG. 1 depicts an exemplary high-level flow diagram 100 of example major stream grading steps, according to an exemplary embodiment of the invention. Flow diagram 100 of FIG. 1 can begin with 102 and can according to an exemplary embodiment continue immediately with 104, according to an exemplary embodiment.

In 104, flow diagram 100 can include receiving time-stamped data, and writing the time-stamped data to an exemplary electronic database, and can include exemplary tagging with an exemplary part, process, and feature, according to an exemplary embodiment. From 104, flow diagram 100 can continue with 106.

In 106, flow diagram 100 can include where, periodically, such as, e.g., but not limited to, every 24 hours, etc., an automated electronic analysis engine can be provided and can write a summary record for each unique part/process/feature data stream with any new data, according to an exemplary embodiment. From 106, flow diagram 100 can continue with 108.

In 108, flow diagram 100 can include, on request, automatically electronically computing a grade, by the automated electronic analysis engine, where the grade can be automatically computed for each data stream defined in an example query, according to an exemplary embodiment. From 108, flow diagram 100 can continue immediately with 110.

In 110, flow diagram 100 can include, processing process stream grades, and presenting the process stream grades as part of an interface including, e.g., but not limited to, one, or more, or all, of the following of: a stream analysis table, a grading matrix, and/or a site summary grid, according to an exemplary embodiment. From 110, flow diagram can continue immediately with 112, and in one embodiment, can immediately end, according to an exemplary embodiment.

Referring to FIG. 1, according to an exemplary embodiment of the invention, a flow diagram 100 of the major grading steps can include, wherein the process grading system can allow data to be entered into an exemplary source database from various data acquisition techniques found within modern manufacturing facilities, according to an exemplary embodiment. However, the data, according to one exemplary embodiment, must be properly tagged with the associated part name, the name of the feature being measured, and the name of the process that was used to create the feature. Each unique part/process/feature combination, according to an exemplary embodiment, can be defined as a stream. The number of potential unique streams that a manufacturing business may choose to manage, according to an exemplary embodiment, can often easily exceed 100,000 unique streams, and with large enterprises, the number of streams of the large enterprise can exceed 1,000,000 unique streams. For example, a medium sized food company can produce over 2,000 product codes (SKUs), according to an exemplary embodiment. Assuming, according to an exemplary embodiment, there are an exemplary 10 sub-components or ingredients used to produce each of the exemplary finished goods, with an exemplary 50 total process steps needed to transform all of the exemplary raw materials into finished goods, and there can be, e.g., but not limited to, 5 exemplary quality checks measured at each exemplary process step, the total unique streams for this example scenario is the product of 2,000×10×50×5=5,000,000, according to an exemplary embodiment. This staggering number of streams can only be managed using sophisticated storage, computation, analysis, and presentation engines as set forth herein, according to an exemplary embodiment.

Figure 2:
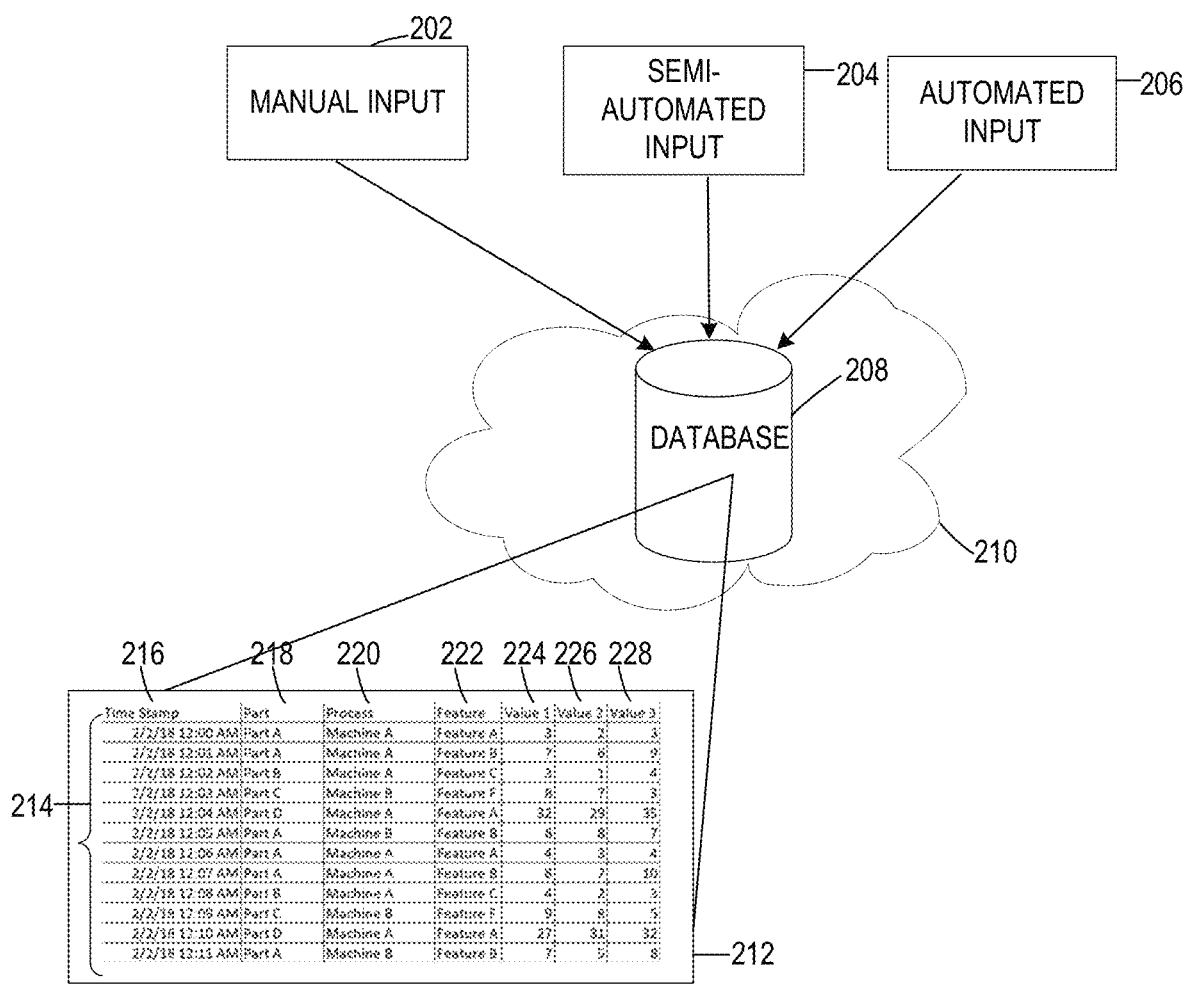
FIG. 2 is an illustrated representation of how data are written and stored into an example cloud database, according to an exemplary embodiment of the invention.

FIG. 2 depicts an exemplary illustrated representation of how data can be written and stored in an exemplary cloud database 208, according to an exemplary embodiment of the invention. FIG. 2 depicts a diagram 200 illustrating an exemplary electronic cloud-based database receiving exemplary data received from manual input 202 into one or more client computing devices (not shown), semiautomated input 204 from exemplary client computing devices (not shown), and automated input 206 from exemplary client computing devices (not shown), where the exemplary client computing devices are coupled together via an electronic network 210 represented in the illustration by a cloud symbol. The exemplary electronic database 208 can include any of various useful database types, preferably a relational database, but alternatively could be implemented with any of various other database types such as, e.g., but not limited to, a flat file, and/or a spreadsheet database, and/or a hierarchical database, and/or a relational database, and/or a graph database, among others, and the like, according to an exemplary embodiment of the invention. As shown in an exemplary embodiment of exemplary callout illustration 212, of exemplary database 208 can include, according to an exemplary embodiment of the invention, various exemplary data records 214, which can as shown in one embodiment can be sorted by timestamp, and/or which, according to an exemplary embodiment of the invention, can include one or more fields such as, e.g., but not limited to, an exemplary time stamp field 216, a part field 218, a process field 220, a feature field 222, a value1 field 224, a value2 field 226, a value3 field 228, among other example fields (not shown), etc.

Figure 15:
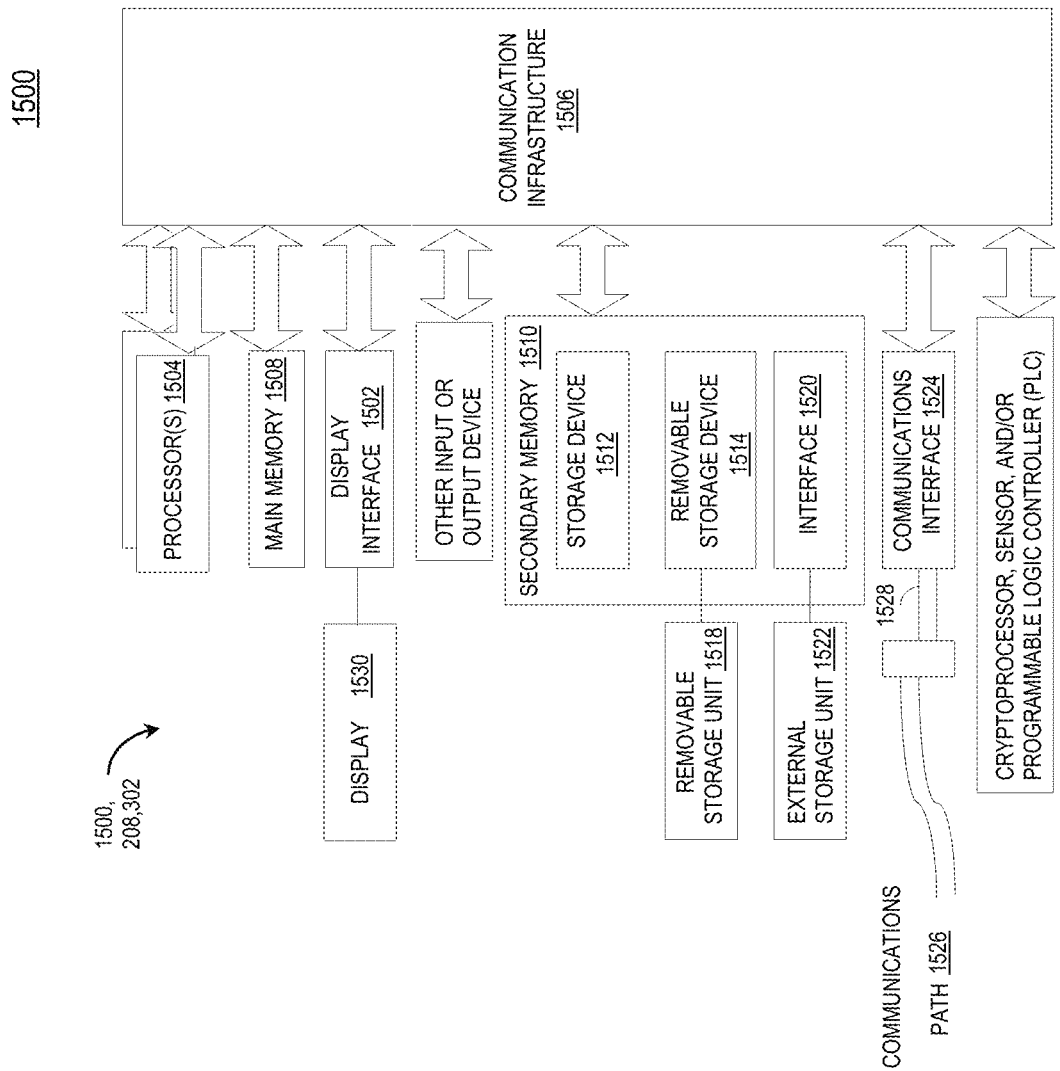
FIG. 15 depicts an exemplary computing device as may be used for any of various devices of the various systems disclosed herein.

Referring to exemplary FIG. 2, according to an exemplary embodiment of the invention, a raw data record can be accepted from a multitude of electronically entered means, according to an exemplary embodiment of the invention. The most basic input method, according to an exemplary embodiment of the invention can include keyboard or other input device entry into an electronic computing device such as, e.g., but not limited to, a client device, such as shown in FIG. 15, according to an exemplary embodiment of the invention. According to one embodiment, a person can initially capture data points manually via a notebook or other manual means, and can later, use an electronic client computer device to receive via an exemplary input device capture of the data electronically. Alternatively, the user can use a client computer device, as shown, e.g., in FIG. 15 below, according to one embodiment, to receive the data electronically into the electronic database 208, 212, 302, 310 using the computer keyboard and/or other electronic input device such as, e.g., but not limited to, a touchscreen, a stylus and enabled tablet or sensor screen, a mouse, pointing device, etc. As the data are being electronically received into the exemplary electronic database system, the user can also be prompted, so the database can receive an associated part, process, and feature name(s) associated with the data captured for use in later electronic analysis to support future automated electronic grading analysis, according to an exemplary embodiment. Other exemplary electronic data collection systems can also be used by manufacturers including, e.g., but not limited to, semiautomated electronic data capture, which can include capture by way of exemplary electronic gauges, and/or sensors including e.g., but not limited to, micrometers, calipers, balances, meters with an electronic output option, visual sensors, electronic cameras, etc. Data from these electronic devices can, according to an exemplary embodiment, send raw data values directly to the database through exemplary cables (not shown) connected to, or coupled to, the electronic network 210, which can include an electronic and/or optical communications network, and/or wireless communications system, network and transceivers for transmittal and receipt into the electronic database system 200. These exemplary types of data can then post processed with an associated part, process, and feature name tags, prior to or along with writing the data packet to the database 208, according to an exemplary embodiment. The third exemplary input method can include a fully automated data capture process 206, which according to an exemplary embodiment, can include, e.g., but not limited to, software tools, and/or the like, which can be used to query disparate data sources for receiving, and/or capturing, and/or collecting, collected values, parts, processes, and feature names and then can automatically write the records 214 to the exemplary database 208 using specially designed connections and/or couplings to allow electronically time-stamped data capture of various electronic data record fields as required by the exemplary analysis engine, according to an exemplary embodiment. Once the data record packets are accessible in the database 208, the records can be placed in, and can follow the same format, according to an exemplary embodiment. For example, data records from disparate sources can be normalized and/or processed and/or the data can be augmented, edited, and/or modified for consistency, and uniformity of data format, according to an exemplary embodiment. The grading engine, according to an exemplary embodiment, is agnostic to the methods used to acquire the data.

Figure 3:
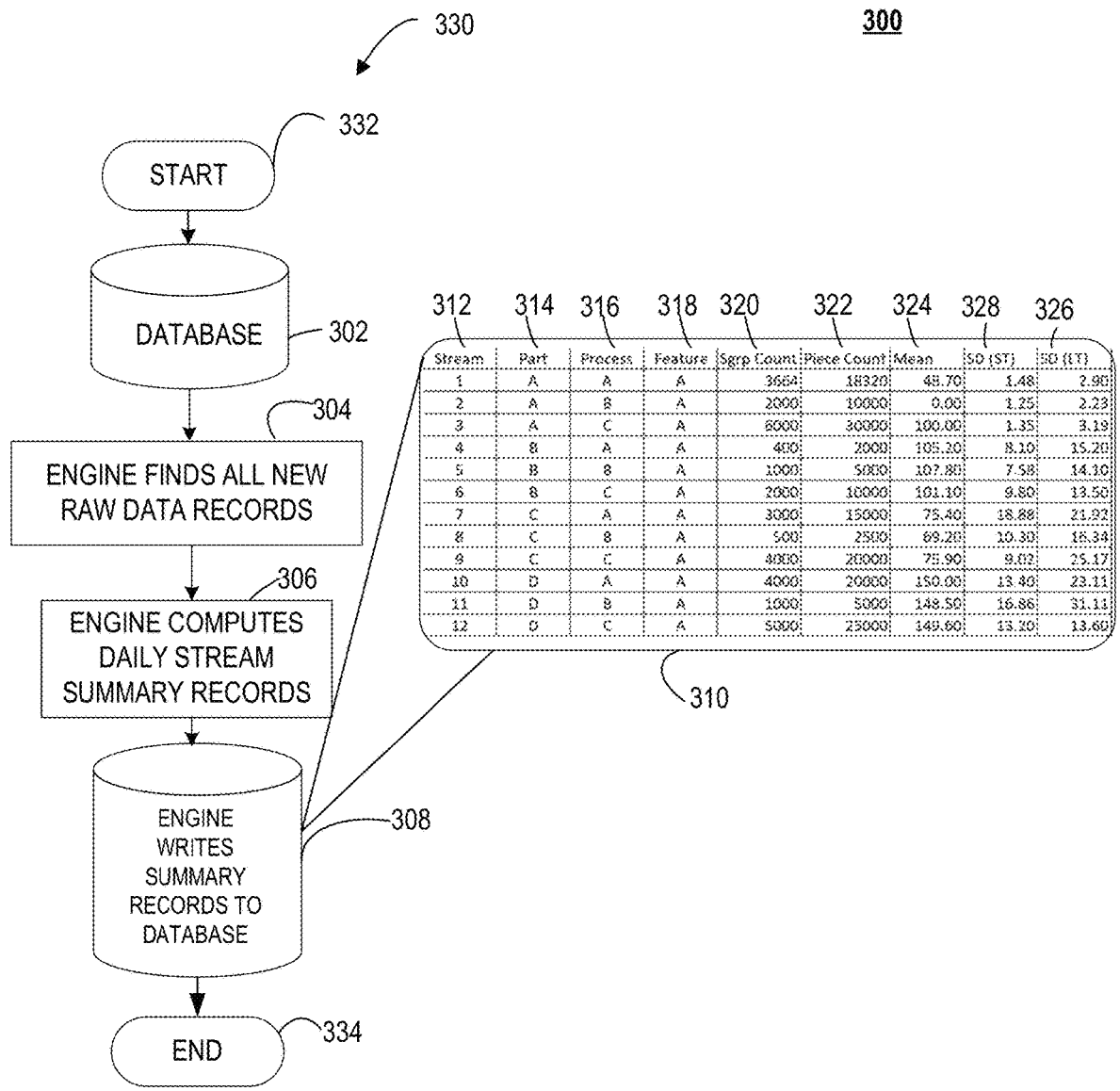
FIG. 3 depicts an exemplary flow diagram illustrating an exemplary analysis engine writing daily or other periodic summary records of an example flow diagram of how summary records can be derived, along with calculating exemplary statistical analyses, illustrating what computational statistics can be calculated, according to an exemplary embodiment of the invention.

FIG. 3 depicts in a drawing 300, an exemplary flow diagram 330 illustrating an exemplary analysis engine writing daily or other periodic summary records, along with calculating exemplary statistical analyses, according to an exemplary embodiment of the invention. According to an exemplary embodiment, diagram 300 includes the flow diagram 330, and exemplary summary database record fields 310 illustrated together (it should be noted, as will be apparent to those skilled in the relevant art, that although shown logically in a particular manner in exemplary illustrations, for purposes of description and explanation, this logical representation need not be the physical embodiment of such data), according to an exemplary embodiment of the invention. Example flow diagram 330 can begin with 332 and can continue immediately with 302, according to an exemplary embodiment of the invention. In 302, flow diagram 330 can access data from a database 302, which can be a similar database to database 208 from FIG. 2, and/or can be a further processed version of database 208, according to an exemplary embodiment of the invention. In one exemplary embodiment, portions of database 208 can be replicated, duplicated, and/or archived, and/or historically parsed, stored, and/or processed prior to access to obtain database 302, and/or can be the same database as 208, according to an exemplary embodiment of the invention. According to an exemplary embodiment, at particular times, such as, e.g., but not limited to, on a periodic basis, on a daily basis, on a weekly basis, on an aperiodical basis, on an ad hoc basis, or in realtime, etc., the data in database 302 can be accessed and be processed as described in exemplary flow diagram 330, according to an exemplary embodiment of the invention. From 302, flow diagram 330 can proceed with 304, according to an exemplary embodiment of the invention.

In 304, an automated electronic analysis engine can find and/or identify any and/or all new raw data records in the database 302, and can provide further exemplary processing of such raw records, according to an exemplary embodiment of the invention. From 304, according to an exemplary embodiment of the invention, flow diagram 330 can continue with 306.

In 306, according to an exemplary embodiment of the invention, the automated electronic analysis engine can compute an exemplary daily (or other time categorized) stream of exemplary summary records, computationally analyzing the raw data and calculating, e.g., statistical analyses of the exemplary raw data, such illustrated, according to an exemplary embodiment of the invention. From 306, flow diagram 330 can continue with 308, according to an exemplary embodiment of the invention.

In 308, flow diagram 330 can include, e.g., writing, by the electronic automated analysis engine, one or more summary records to the database 302, 208, according to an exemplary embodiment of the invention. From 308, flow diagram 330 can, according to an exemplary embodiment of the invention, immediately proceed to 334 and end.

In 308, the exemplary summary data records 310 as processed and/or computed in 306, can include as illustrated, according to an exemplary embodiment of the invention, any of various data records, such as the exemplary dozen illustrated 1-12 streams 312, along with associated fields including, e.g., but not limited to, exemplary part field 314 (with exemplary values A-D, and/or alphanumeric values), exemplary process field 316 (with exemplary values A-C, and/or alphanumeric values), exemplary feature field 318 (with exemplary values A, and/or alphanumeric values), exemplary Sgrp Count field 320 (with exemplary numeric values), exemplary Piece Count field 322 (with exemplary numeric values), exemplary Mean field 324 (with exemplary calculated average numeric values), exemplary SD (ST) field 326 (with exemplary numeric values) for a standard deviation over an exemplary shortterm, and an exemplary SD (LT) field 328 (with exemplary numeric values) for a standard deviation over an exemplary longterm, according to an exemplary embodiment of the invention. Although as illustrated, a daily summary record can be calculated and stored, this is illustrated by way of example and illustration, but not limited as a required necessity. According to an exemplary embodiment, both the SD(ST) and SD(LT) analyze the same amount of data for the same period of time, i.e., all the data contained within the stream's daily record, according to an exemplary embodiment. However, the SD(ST) is a standard deviation calculation that restricts the measure of variability to within a subgroup, or between consecutive subgroups when the subgroup size is 1, according to an exemplary embodiment. When there are several subgroups contained within the daily record, this calculation is effectively the average level of variability expected to be found within a single subgroup, according to an exemplary embodiment. The SD(LT) uses a formula that ignores the subgrouping and treats each data value as a reading collected from the day's population of data, according to an exemplary embodiment. In most cases, according to an exemplary embodiment, data within a single subgroup were captured during the same time period, such as, e.g., but not limited, like a snapshot of the variation at that given point in time, according to an exemplary embodiment. When subgroups are collected every 30 minutes, according to an exemplary embodiment, the SD(ST) is the expected variation that is typically found within any given snapshot of time, in an exemplary embodiment. The SD(LT), according to an exemplary embodiment, on the other hand, is the total expected amount of variation contained within a population of data; in the case of summary records, the SD(LT) is the expected total amount of variation one could expect within a day's worth of production of the given stream, according to an exemplary embodiment.

Referring to FIG. 3, according to an exemplary embodiment of the invention, an engine can execute an automated procedure to search the exemplary database 302, 208 for any new data that may have been entered into the system over the previous 24 hours, or other time duration of interest, according to an exemplary embodiment of the invention. A summary record can be calculated and/or stored to the database 302, 208 for, e.g., all streams with new data, according to an exemplary embodiment of the invention. A given stream can have no more than one summary record for every 24 hours, according to an exemplary embodiment of the invention, no matter how much data were entered for that stream, in one exemplary embodiment. Data can be entered for an exemplary stream 24/7/365 (24 hours per day, 7 days per week, 365 days per year), according to an exemplary embodiment of the invention, and there can be 365 summary records generated for that stream each year, according to an exemplary embodiment of the invention. Conversely, or in the alternative, a summary record can not be written for any stream that has had no new data entered in, during the previous 24 hours, or other example time period, according to an exemplary embodiment of the invention. The example daily summary records can contain, according to an exemplary embodiment of the invention, an example nine pieces of information, including, e.g., but not limited to: a record ID, part name, process name, feature name, number of pieces, number of subgroups, mean, short-term standard deviation, and long-term standard deviation, according to an exemplary embodiment of the invention. The summary record, according to an exemplary embodiment of the invention, can generate these calculated statistics by computationally analyzing and calculating from data that were entered only from the previous exemplary 24 hour window, according to an exemplary embodiment of the invention. An exemplary stream that only contains one value for the exemplary 24 hours can use that value as the mean, according to an exemplary embodiment of the invention, but no standard deviations can be calculated for that stream for that day, according to an exemplary embodiment of the invention.

Figure 4:
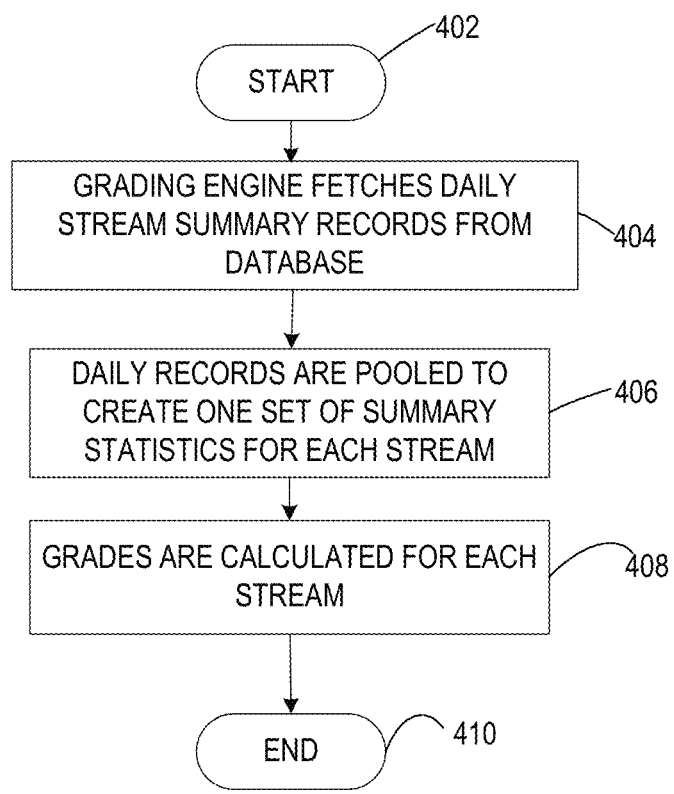
FIG. 4 is the stream summary grade computing flow, according to an exemplary embodiment of the invention, depicting an exemplary flow diagram illustrating an exemplary grading engine computing stream summary grades, according to an exemplary embodiment of the invention.

FIG. 4 depicts an exemplary flow diagram 400 illustrating an exemplary grading engine computing stream summary grades process flow, according to an exemplary embodiment of the invention. Flow diagram 400, according to an exemplary embodiment can begin with 402 and can continue immediately with 404.

In 404, flow diagram 400, can include where the automated grading engine automatically electronically fetches an exemplary daily stream summary records 310 from database 302, 208, according to an exemplary embodiment. From 404, flow diagram 400 can continue immediately with 406.

In 406, flow diagram 400, can include where the exemplary daily stream summary records 310 from database 302, 208 can be electronically pooled and/or merged to create an exemplary one set of summary statistics for each stream, according to an exemplary embodiment. From 406, flow diagram 400 can continue immediately with 408.

In 408, flow diagram 400, can include where the exemplary grades can be electronically computed and/or calculated for each stream, according to an exemplary embodiment. According to one exemplary embodiment, grades can be presented in real-time, and/or may be stored only in main memory, only so long as to be able to display them, or provide them by other example output, according to an exemplary embodiment. The computed grades, according to another exemplary embodiment, can be stored, and/or archived, and or maintained for an exemplary history, and/or alternatively calculated in realtime for display, and/or any combination, and/or other provision to a user via exemplary output. From 408, flow diagram 400 can continue immediately with 410, and can immediately end.

Referring to FIG. 4, according to an exemplary embodiment of the invention, the user can open an exemplary electronic dashboard, such as, e.g., but not limited to, an electronic graphical user interface (GUI)-based, electronic decision support system (DSS) and/or executive information system (EIS), according to an exemplary embodiment, that can be linked, according to an exemplary embodiment, to an exemplary parameter set. An exemplary parameter set, according to an exemplary embodiment, can include, e.g., but is not limited to providing, specifying a time frame, a selection of part(s), process(es), and feature(s), according to an exemplary embodiment. When executed, the exemplary grading engine, according to an exemplary embodiment, can be constrained to the exemplary dashboard's parameter set, according to an exemplary embodiment. For each stream that is defined the parameter set and contains data, a grade can be calculated using, e.g., but not limited to, weighted pooled standard deviation roll-up across all the daily summary records and the weighted mean, according to an exemplary embodiment. Daily records, according to an exemplary embodiment, that are based on larger piece counts can be weighted higher than those records based on fewer piece counts, according to an exemplary embodiment. The exemplary computed grade can require comparisons of the weighted means and pooled standard deviations against the stream's current specification limits, according to an exemplary embodiment.

Figure 5:
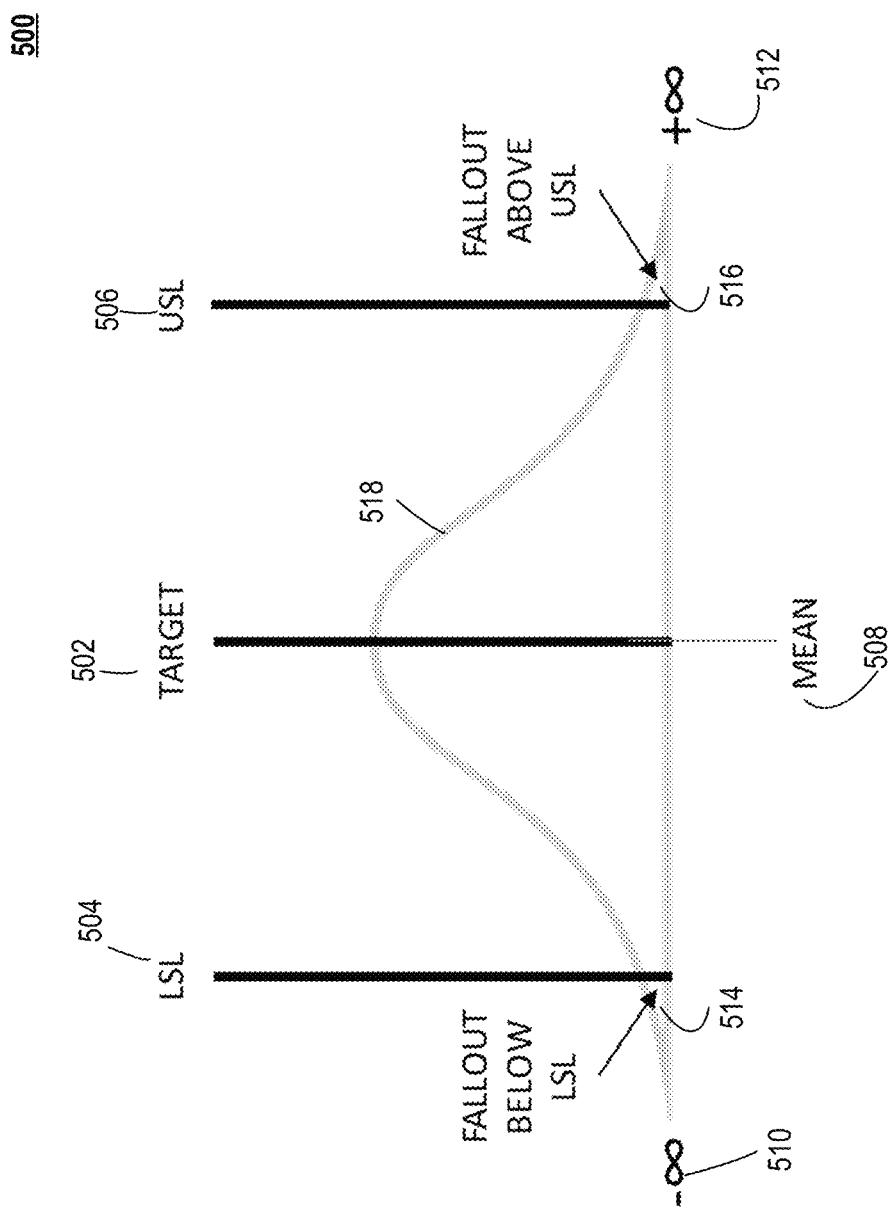
FIG. 5 depicts an exemplary diagram illustrating an exemplary centered process as compared to a target specification, according to an exemplary embodiment of the invention.

Referring to FIG. 5, illustrating an exemplary bell curve with the data's mean largely centered at that target with a very small portion shown with fallout below the lower specification limit (LSL) and a very small portion with fallout above upper specification limit (USL) according to an exemplary embodiment.

Yield Potential Calculation $$\text{Yield Potential} = 1 - (\text{Proportion Fallout Above USL} + \text{Proportion Fallout Below LSL}) \quad \text{Eq. 1}$$

Referring to the equation Eq. 1 and with reference to FIG. 5, according to an exemplary embodiment an exemplary yield potential calculation can be computed, and can, assuming a centered process, include computing a Yield Potential by computing a sum of Proportion Fallout Above USL, and a Proportion Fallout Below LSL.

$$\text{Fallout above USL} = (1 - \text{NORM.S.DIST}((\text{USL} - \text{TARGET})/\text{SDST})) \quad \text{Eq. 2}$$

$$\text{Fallout Below LSL} = (1 - \text{NORM.S.DIST}((\text{TARGET} - \text{LSL})/\text{SDST})) \quad \text{Eq. 3}$$

Referring to equations 2 and 3 with reference to FIG. 5, according to an exemplary embodiment, the automated electronic grading engine can perform computations including, an exemplary Fallout above USL by performing a computation (1−NORM.S.DIST((USL−TARGET)/SDST)), see Eq. 2 above; and computation of an exemplary Fallout Below LSL by performing a computation (1−NORM.S.DIST((TARGET−LSL)/SDST)), see Eq. 3 above; and where 1−NORM.S.DIST is a computation function, such as, e.g., but not limited to, a computationally computed electronic function of a MICROSOFT EXCEL spreadsheet, available from MICROSOFT CORPORATION from Redmond, Wash. USA, such function that converts an exemplary electronically accessible z-score to a proportion fallout, and the SDST is the Standard Deviation Short Term. As depicts in diagram 500, an exemplary curve 518 can be seen centered with mean 508 on a target value 502, with USL 506, and LSL 504, and Fallout Above USL 516, and Fallout Below LSL 514 on a curve from negative infinity 510 to positive infinity 512. According to an exemplary embodiment, computationally determined values of exemplary grades, the A, B, or C portion of the grade can be based on yield potential, according to an exemplary embodiment. The yield potential is the value 1 minus the proportion fallout beyond the upper and lower specification limits assuming a normal distribution and the process mean is centered between the upper and lower engineering specifications, according to an exemplary embodiment. This is a measure of how good a process stream can perform under ideal conditions, according to an exemplary embodiment.

Figure 6:
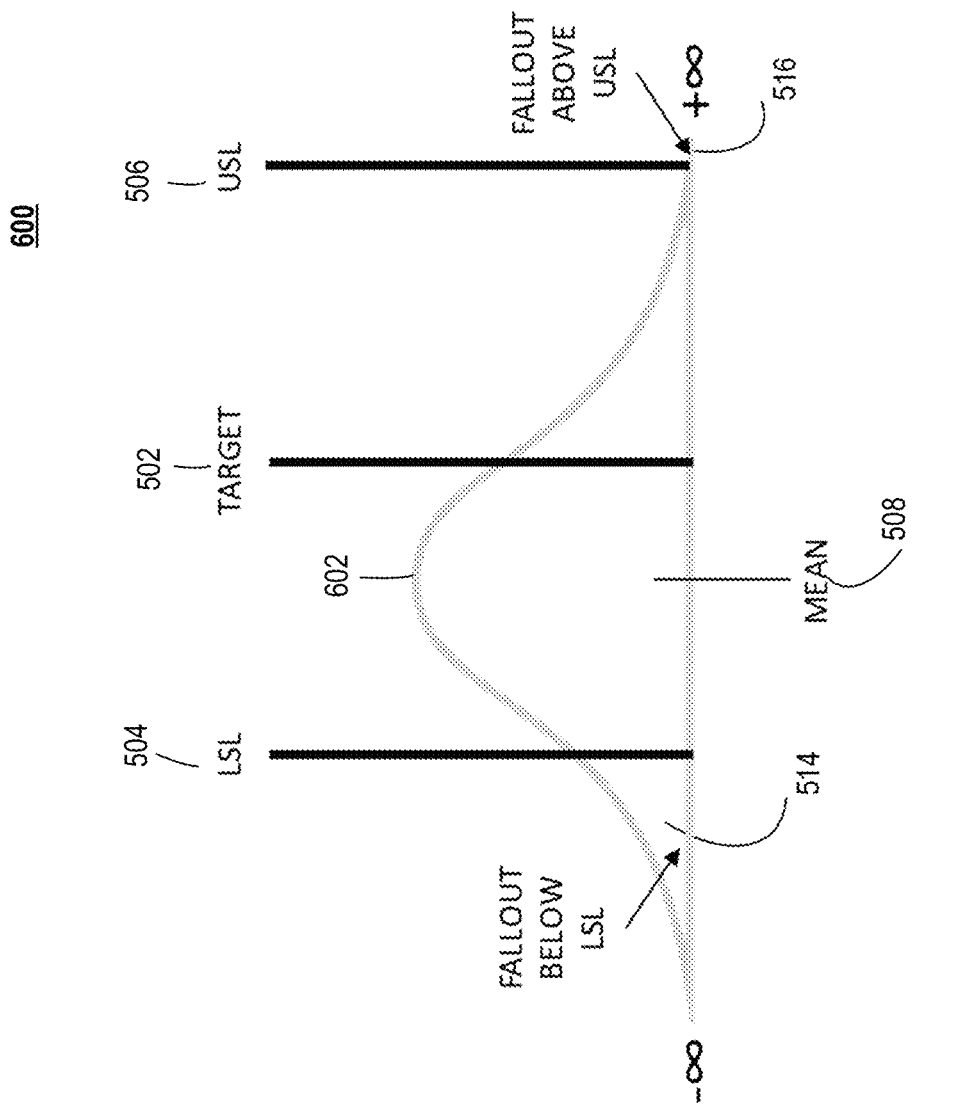
FIG. 6 depicts an exemplary diagram illustrating an exemplary off center process as compared to a target specification, illustrating significant fallout below LSL and a mean below target, and limited fallout above USL, according to an exemplary embodiment of the invention.

FIG. 6 depicts an exemplary diagram 600 illustrating an exemplary off center process curve 602 as compared to a target 502 specification, illustrating significant fallout 514 below LSL 504 and a mean 508 below target 502, and limited fallout 516 above USL 506, according to an exemplary embodiment of the invention.

Referring to FIG. 6, according to an exemplary embodiment of the invention, the expected yield is the expected fallout beyond the upper and lower specification limits and taking into account the stream's mean as compared to the center of the specification limits, but still assuming a normal distribution.

Yield Performance Calculation $$\text{Yield Performance} = \frac{\text{Expected Yield}}{\text{Yield Potential}} \quad \text{Eq. 4}$$

Referring to the equation Eq. 4, Yield Performance is the quotient of the value for Expected Yield divided by Yield Potential, the 1, 2, or 3 portion of the grade is based on the ratio of the stream's yield potential and expected yield. The calculation is simply expected yield divided by yield potential.

FIG. 7 depicts an illustrative display 700 of an example output chart including an exemplary graphical user interface of an exemplary user interface matrix chart showing exemplary upper (maximum yield 708) and lower (minimum yield 706) yield thresholds of exemplary three level grading 704, according to an exemplary embodiment, i.e., grading heading 704 and exemplary grading A 716, B 718, C 720 alpha yield potential grades (exemplary but nonlimiting three levels), and 1 722, 2 724, 3 726 numeric yield performance grading ranks (exemplary but nonlimiting three levels), and associated exemplary high 728, 734, moderate 730, 736, and low 732, 738 ranges associated with both the alpha and the numeric grades, respectively, according to an exemplary embodiment of the invention. The alphabetical, exemplary 3 level grade A, B, C can be used with respect to the exemplary Yield Process 712 (as shown with the example centered process), Yield Performance 714, and associated heading 702, and definitions 710 including descriptive definitions for each of the grading levels.

Thus, referring to FIG. 7, according to an exemplary embodiment of the invention, this matrix shows the upper and lower yield thresholds of the A, B, C yield potentials, and 1, 2, 3 yield performance ranks, according to an exemplary embodiment. As will be apparent to those skilled in the relevant art, slight modifications to the grading process such as, e.g., by increasing granularity of grading and/or slight modifications to min and max yield percentage values, and/or naming terminology or definitions for the various grade levels, e.g., such as, high medium, low, etc., can be made without straying from the spirit and scope of Applicant's claimed invention.

Figure 8:
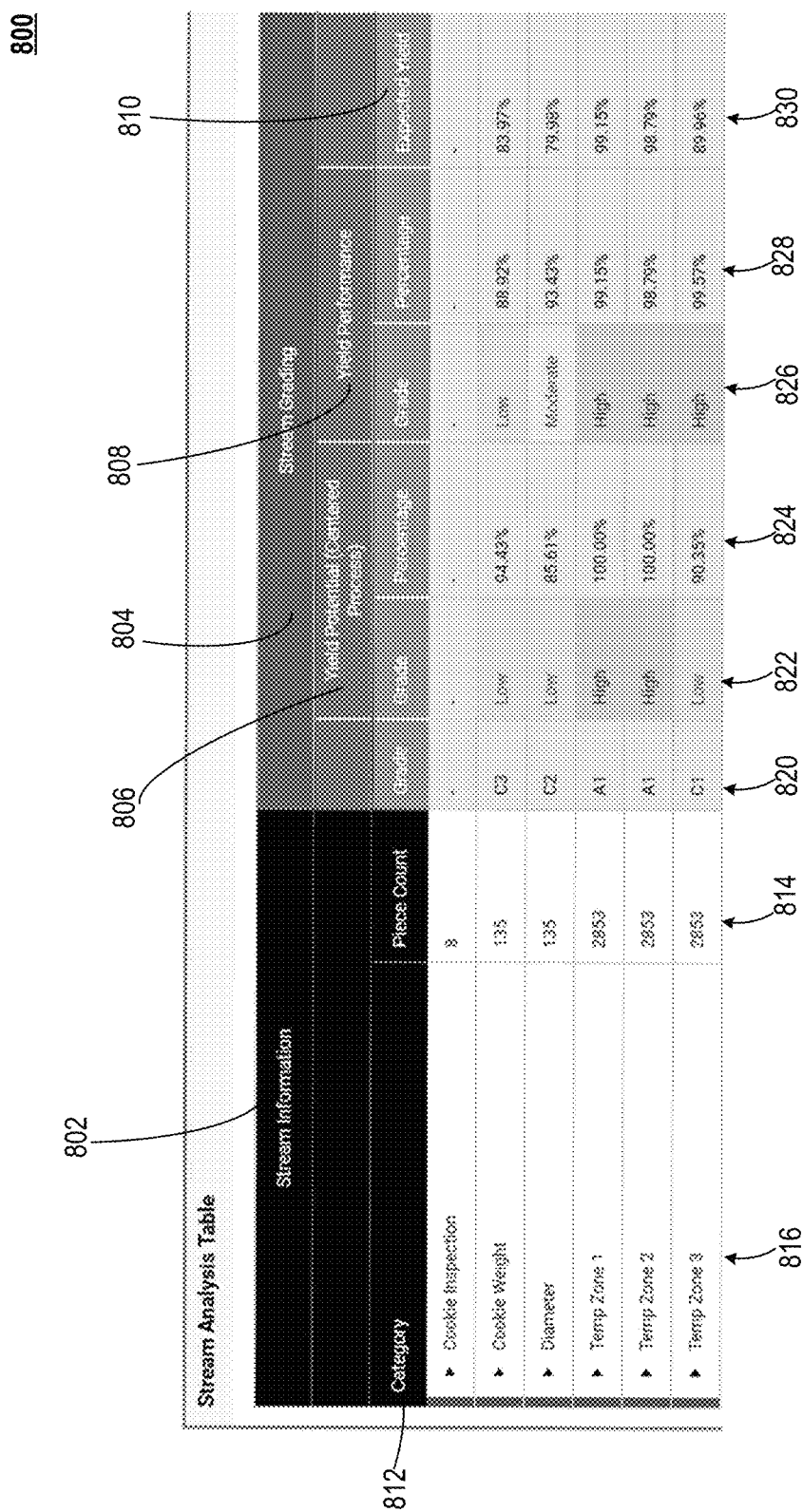
FIG. 8 depicts an illustration of an example Stream Analysis Table, according to an exemplary embodiment of the invention.

FIG. 8 depicts an exemplary illustration 800 of an example Stream Analysis Table, according to an exemplary embodiment of the invention, which can include various exemplary columns including, e.g., but not limited to, exemplary stream information 802, and stream grading 804, according to one embodiment.

Figure 9:
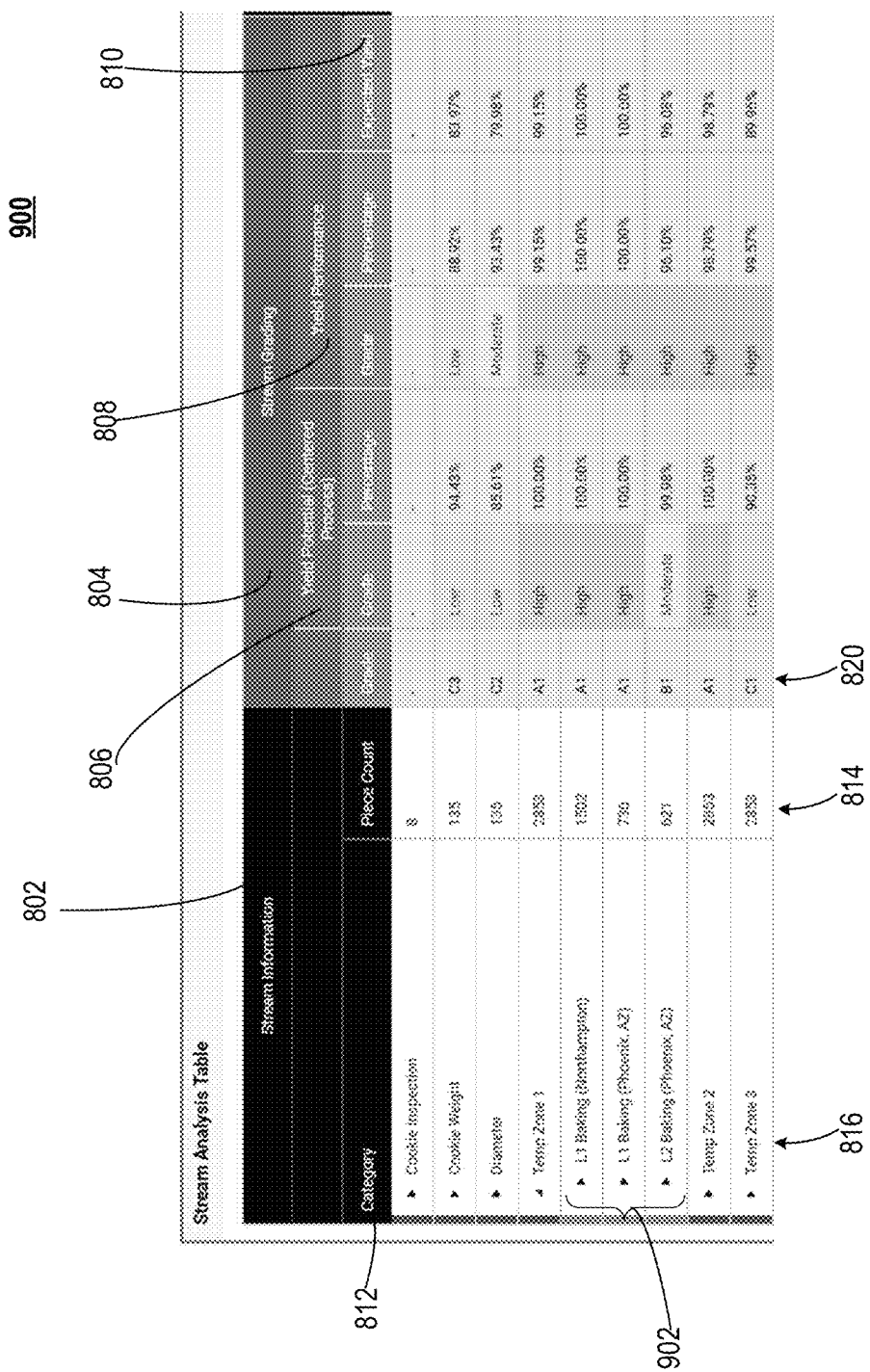

According to an exemplary embodiment, stream information 802 can include sub columns such as, e.g., but not limited to, a category column 812 in which various categories 816 may be included, and an exemplary piece count column 814 with various numeric counts by particular category listed in listed categories 816 of categories 812. Similarly, for stream grading 804, an exemplary grade column 820 can include an example alphanumeric grade such as, e.g., but not limited to, C3, C2, A1, C1, 820 as shown (as previously explained with reference to FIG. 7 above), as well as Yield Potential (Centered Process) column 804 (with grade 822 and percentage 824), and Yield Performance column 808 (with grade 826 and percentage 828), as well as Expected Yield column 810 (with percentages 830). According to an exemplary embodiment, various categories can be further drilled down upon receipt of a user selected category selection, so as to display a further detailed drill down into subcategories of a given category as illustrated in FIG. 9 below, depicted as a result of selection of Temp Zone 1 in FIG. 8, and as described further below, according to an exemplary embodiment. It is important to note, that "Temp Zone 1" is strictly a sample term for a given piece of equipment, for example, according to an exemplary embodiment. The Temp Zone 1, and/or other categories listed in FIG. 8, are merely illustrative of an exemplary embodiment, and nonlimiting.

Referring to FIG. 8, according to an exemplary embodiment of the invention, the Stream Analysis Table is a grading presentation option where the user can view the rolled-up grade for each feature defined in the parameter set. In this presentation format, the user can quickly learn that a C3 grade can represent a low yield potential, and a low yield performance (poor technology coupled with ineffective operations). A C1 grade can represent a low yield potential, but a high yield performance. C1 streams can exhibit poor technology, but the operations can be deemed to be effective, according to an exemplary embodiment. In other words, the process with this grade can be thought to be such that it will not get any better unless an investment is made in the technology, or maintenance is performed.

Figure 10:
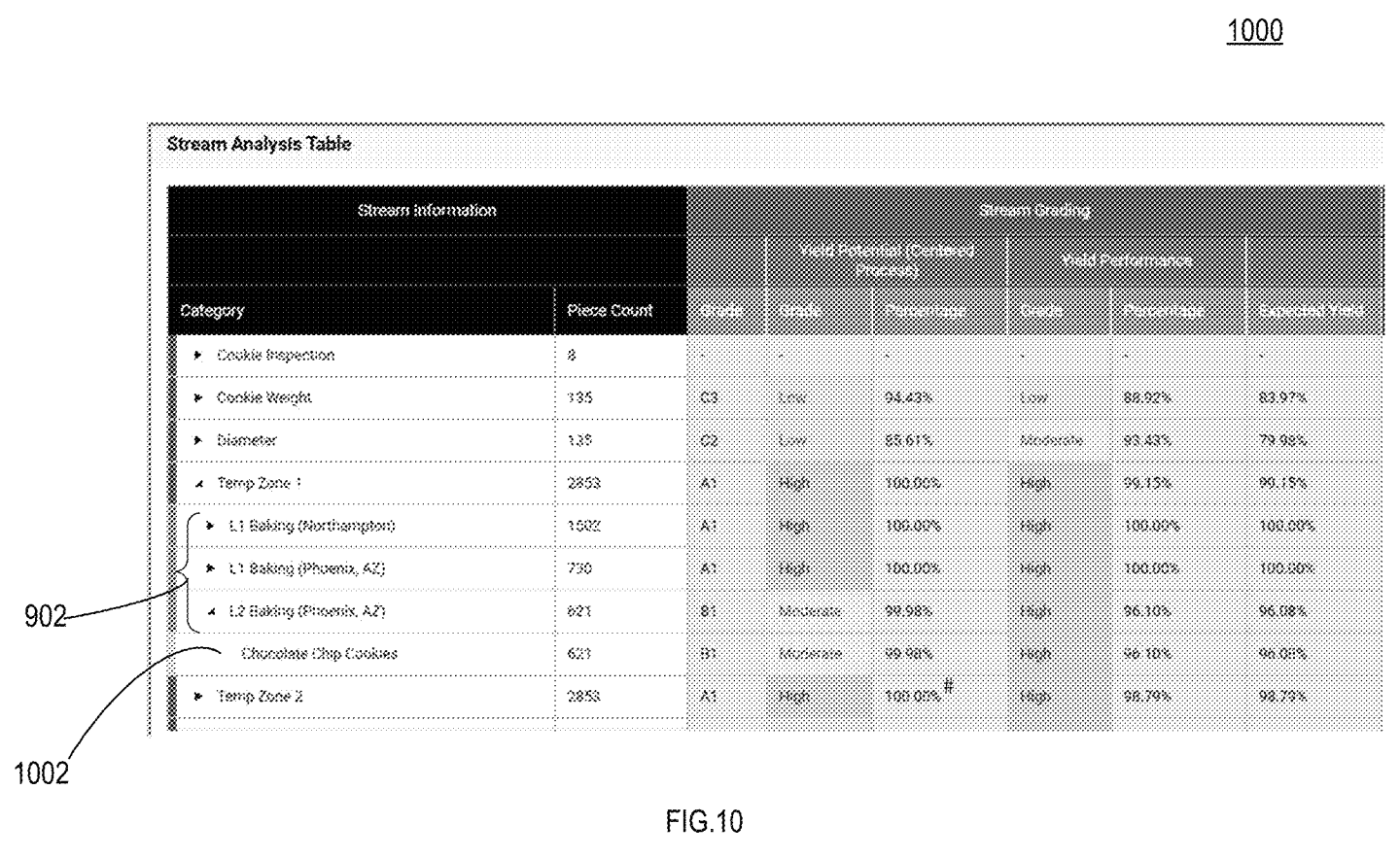

FIGS. 9 and 10 is an illustration 900, 1000 of the Stream Analysis Table showing that summary rows can be rolled down to view the individual streams, and to reveal further details of underlying data, previously aggregated, via user selection of the user interface interaction, according to an exemplary embodiment of the invention.

Referring to FIG. 9, stream analysis table 900 is shown, where the rows in the Stream Analysis Table can be expanded, upon user selection of the user interface element, by selection of the Temp Zone 1 arrow, to see the underlying process 902 and parts that have been rolled up into the feature grade. In the illustration, the feature Temperature Zone 1 (of column 816) got an A1 grade (in column 820), but there is opportunity L2 Baking Line (Phoenix) (the third element of 902) because that combination got a Bi grade (as shown in column 820). This indicates an opportunity for improvement from the review of the Yield Potential, of the component categories, of what otherwise appears to be an optimal category.

Referring to FIG. 10, stream analysis table 1000 is shown, according to an exemplary embodiment of the invention, L2 Baking Line (Phoenix) can be further rolled down (by user selection of the L2 Baking category) to show that there was only one product being produced during the time frame specified in the parameter set. All 621 pieces from that line were from the same part—chocolate chip cookies 1002. Had there been multiple parts, a grade would have been presented for each part. Working with the Stream Analysis Table, users can quickly see, by interacting with the table via the user interface, what part, process, and feature combinations provide the most opportunity for improvement.

Figure 11:
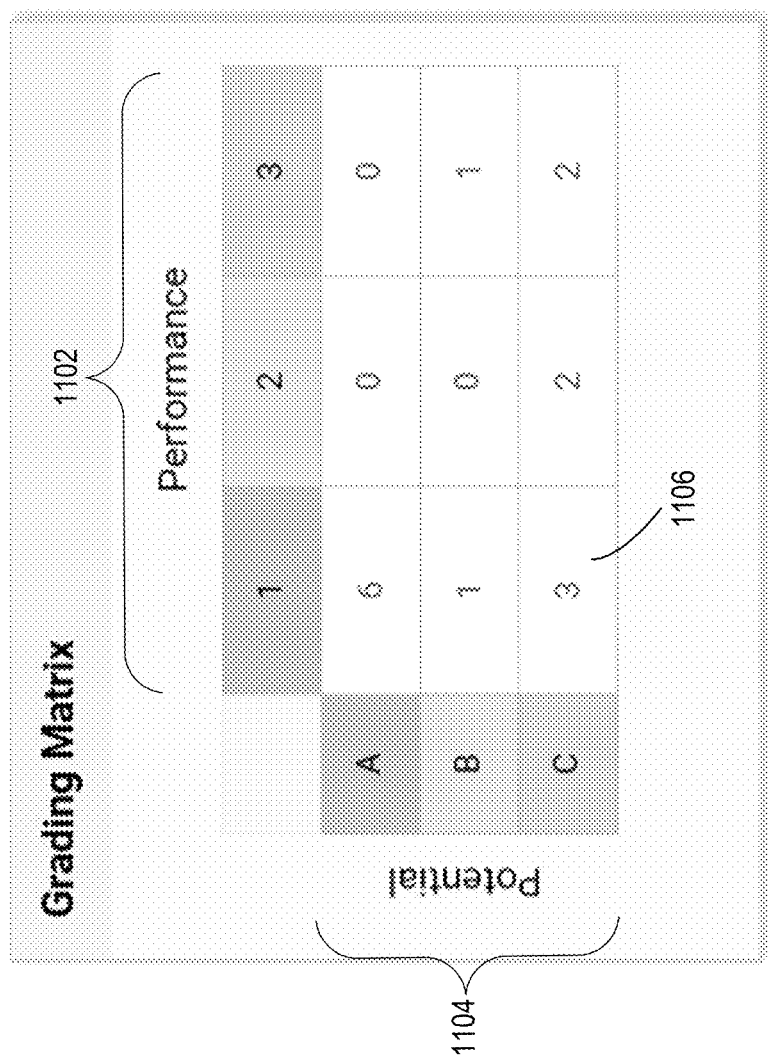
FIG. 11 is an illustration of an example Grading Matrix with grades as displayed on the exemplary matrix, according to an exemplary embodiment of the invention.

FIG. 11 is an illustration of a diagram 1100 depicting an example Grading Matrix with grades as displayed on the exemplary matrix, according to an exemplary embodiment of the invention.

Referring to FIG. 11, a diagram 1100 depicts an exemplary grading matrix, according to an exemplary embodiment of the invention, the Grading Matrix shows how many streams fall into each of the nine possible grades. In the illustration, one can see that there are six A1 streams, or there are two C2 streams. This matrix provides an overall snapshot of all the streams defined in the parameter set. The matrix includes performance on an exemplary horizontal axis 1102, and potential on an exemplary vertical axis 1104. An example number of streams 1106 indicates that there are three (3) streams having a C1 grading.

Figure 12:
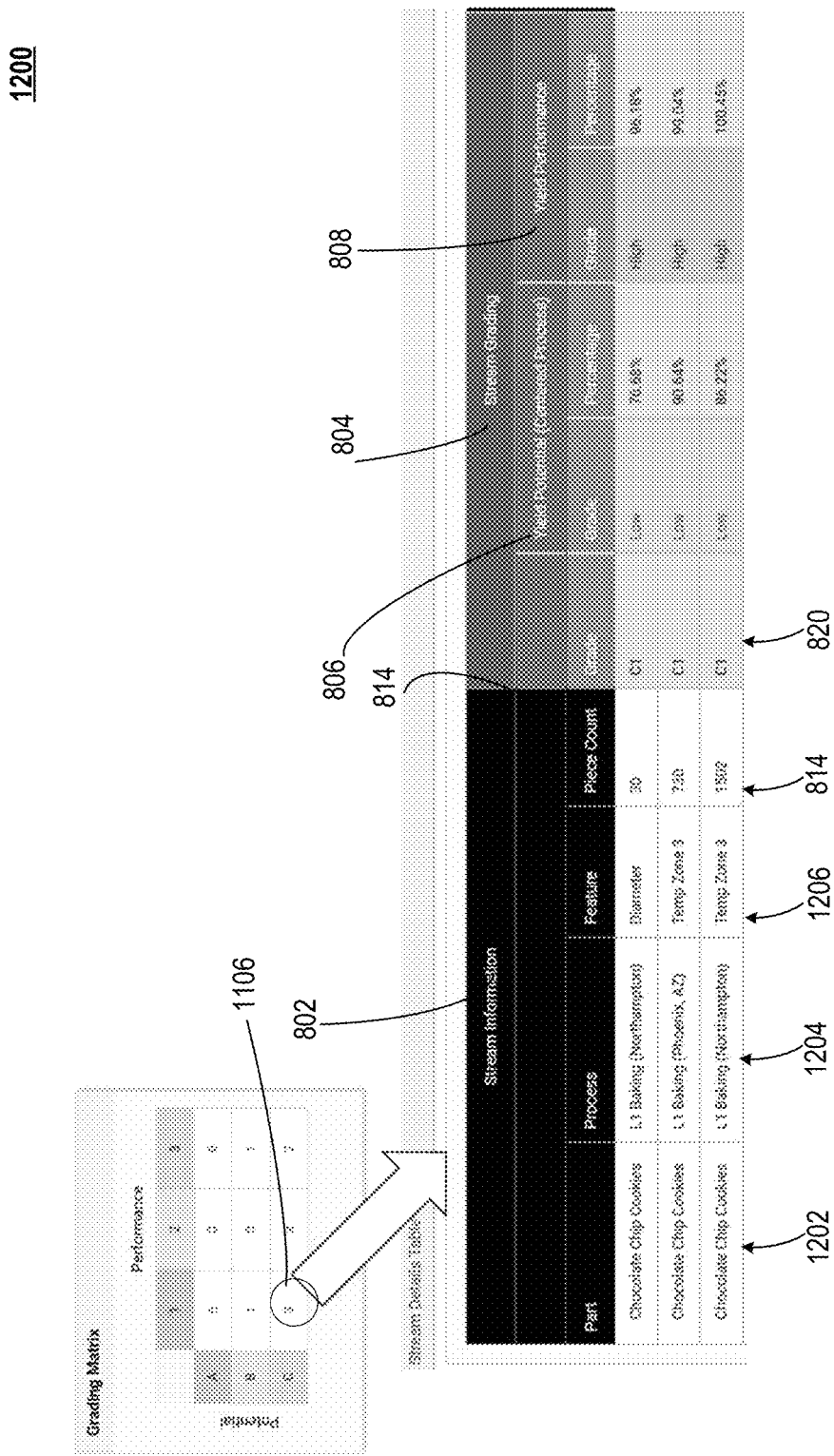
FIG. 12 is an illustration of the click into Stream Details Table accessible by clicking on a number in the Grading Matrix, according to an exemplary embodiment of the invention.

FIG. 12 depicts an exemplary diagram 1200 illustrating the Stream Details Table, resulting from clicking element 1106 (C1 having 3 streams, in the Grading Matrix), according to an exemplary embodiment of the invention.

Referring to FIG. 12, according to an exemplary embodiment of the invention, the numbers in the matrix can be hyperlinked to the all the streams that make up the count, according to an exemplary embodiment. The streams can then be presented in a configurable Stream Details Table, in one embodiment. The illustration shows that all three streams 1106 share the same C1 grade 820. Additional details can include stream information 802, and stream grading 804, including, e.g., but not limited to, piece count 814 and/or yields 806, 806, can also be enabled, such as, e.g., those shown in this illustration, as well as example part 1202, process 1204, and feature 814.

Figure 13:
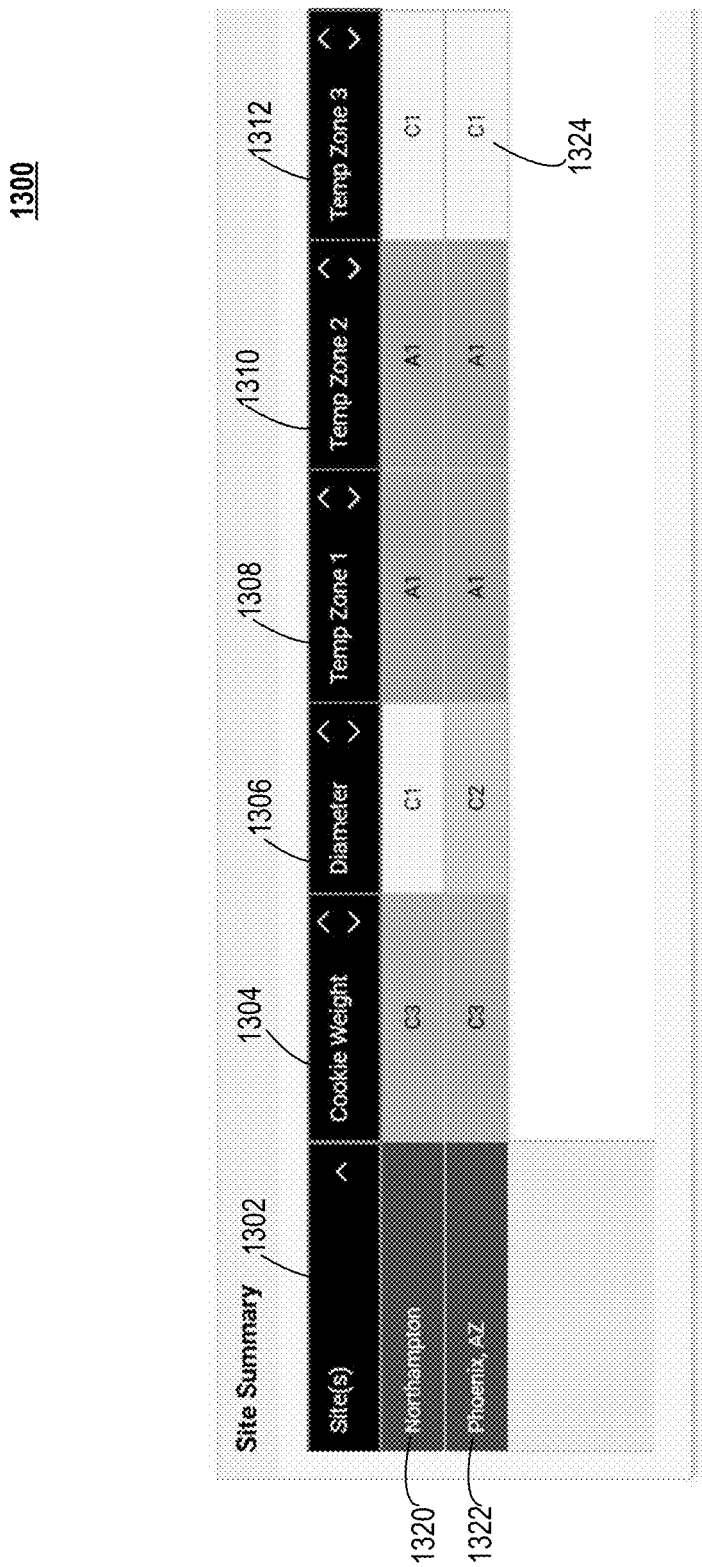
FIG. 13 is an illustration of an example Site Summary grid, according to an exemplary embodiment of the invention.

Referring to FIG. 13, according to an exemplary embodiment of the invention, the Site Summary 1300 can organize the grades by feature name and site. The purpose of this presentation can be to quickly see the rolled up, and/or aggregate, grades for each site across a given set of shared sites critical to quality features. The Site Summary 1300, as shown, is best suited for businesses with multiple sites that produce similar or the same product lines. This illustration shows that both sites perform the same for all named features except for diameter where Northampton earns a slightly better grade than Phoenix, Ariz. The columns are sortable so users can quickly see best to worst, or worst to best, sites by feature 1302, 1304, 1306, 1308, 1310, 1312. Areas of the matrix can be further color coded and/or shaded to further indicate grading levels. For example, grade A1 can be green, and C1, can be yellow, and C2 can be red, in an example embodiment. Further, user selection of element 1324 can allow further drill down into additional detailed stream detail table information as shown in and described with reference to FIG. 14.

Figure 14:
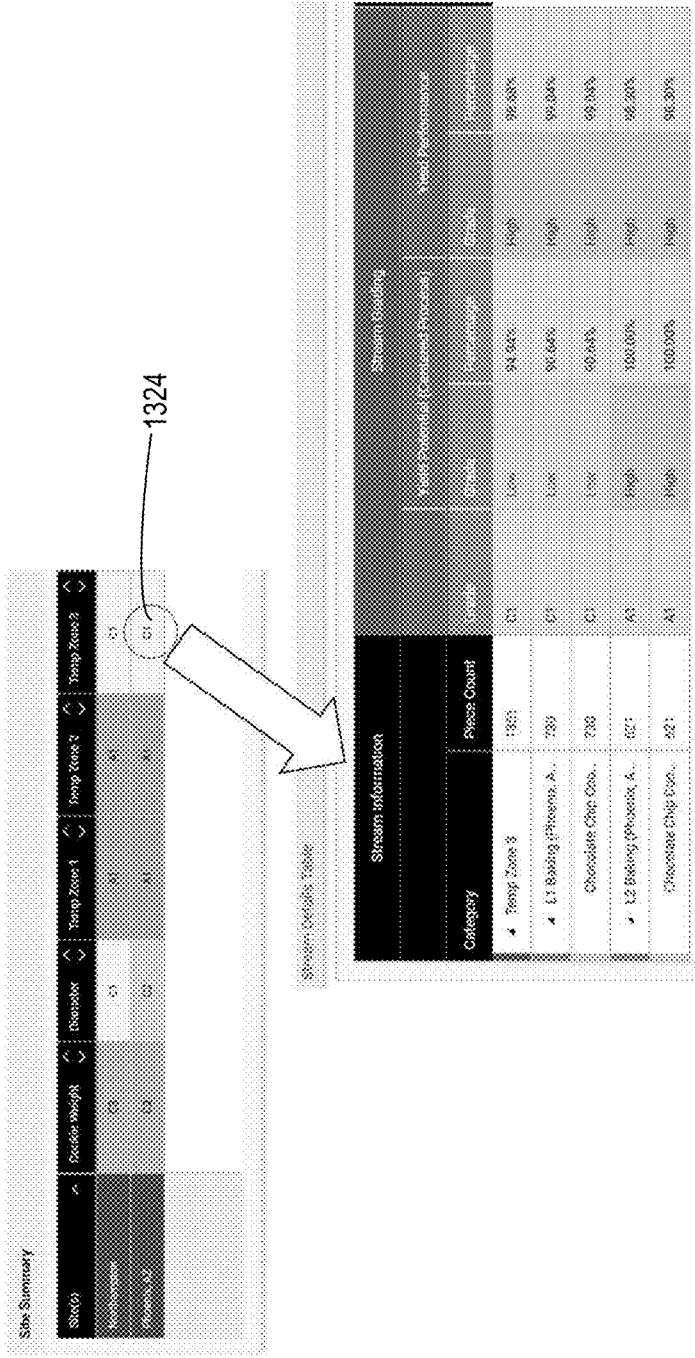
FIG. 14 is an illustration of the click into Stream Details Table accessible by clicking on a grade cell within the Site Summary grid, according to an exemplary embodiment of the invention.

FIG. 14 depicts an illustration 1400 of the results of a user clicking the grade 1324, resulting in display of Stream Details Table accessible by receipt of the user selection, clicking on a grade cell 1324 within the Site Summary grid 1300, according to an exemplary embodiment of the invention.

Referring to FIG. 14, according to an exemplary embodiment of the invention, the grades can be hyperlinked, for user selection of the user interface element allowing display of table 1400 from selection of grade 1324, displaying a Stream Details Table 1400 that can allow the user to roll down into the streams that were used to compute the site/feature grade, according to the exemplary embodiment. The illustration 1400 shows that the C1 grade for Temp Zone 3 and the Phoenix, Ariz. site was computed from chocolate chips from lines L1 and L2. The L2 line earned an A1 grade while the L1 line earned a C1. When the data from both lines are aggregated, the rolled up grade results in yields that earn the site a C1. The system can display and the user can view the details, the 90.64% yield potential from L1 was significantly worse than the L2's 100% and because there was a higher piece count for L1, the aggregated grade resulted in an C1. However, this does provide valuable information, i.e., L1 will produce 90% yields until the technology is upgraded, or maintenance is performed.

Programmable Logic Controllers

For providing further understanding to assist in enabling the making and using of various exemplary embodiments of the claimed invention by a person having ordinary skill in the relevant art, certain manufacturing equipment, which can be configured to include sensors capable of automatic capture of actual production line product specifications, and/or differences from specification, and such sensor-based systems can be controlled by, e.g., a controller, and/or other device capable of electronic capture of manufacturing production line data. A programmable logic controller (PLC), or programmable controller is an industrial digital computer which has been ruggedized and adapted for the control of manufacturing processes, such as assembly lines, or robotic devices, or any activity that requires high reliability control and ease of programming and process fault diagnosis.

PLCs were first developed in the automobile industry to provide flexible, ruggedized and easily programmable controllers to replace hard-wired relays, timers and sequencers. Since then PLCs have been widely adopted as high-reliability automation controllers suitable for harsh environments, as well as other manufacturing product line environments. A PLC is an example of a "hard" real-time system since output results must be produced in response to input conditions within a limited time, otherwise unintended operation will result.

Early PLCs, up to the mid-1990s, were programmed using proprietary programming panels or special-purpose programming terminals, which often had dedicated function keys representing the various logical elements of PLC programs. Some proprietary programming terminals displayed the elements of PLC programs as graphic symbols, but plain ASCII character representations of contacts, coils, and wires were common. Programs were stored on cassette tape cartridges. Facilities for printing and documentation were minimal due to lack of memory capacity. The oldest PLCs used non-volatile magnetic core memory.

More recently, PLCs are programmed using application software on personal computers, which now represent the logic in graphic form instead of character symbols. The computer is connected to the PLC through USB, Ethernet, RS-232, RS-485, or RS-422 cabling. The programming software can allow entry and editing of the ladder-style logic. In some software packages, it can also be possible to view and edit the program in function block diagrams, sequence flow charts and structured text. Generally the software can provide functions for debugging and troubleshooting the PLC software, for example, by highlighting portions of the logic to show current status during operation or via simulation. The software can upload and download the PLC program, for backup and restoration purposes. In some models of programmable controller, the program can be transferred from a personal computer to the PLC through a programming board which writes the program into a removable chip such as an EPROM.

There are two types of contacts in PLCs and the contacts are normally open and normally closed switches. A normally open contact means the contact is on when pressed, and a normally closed contact is on when not pressed. Contacts represent the states of real world inputs like sensors, switches, if the part is present, empty, full, etc. PLCs can also include coils, which can be outputs like motors, pumps, lights, timers, etc. The PLC can examine inputs and turn coils on or off whenever needed. The PLCs can also be used as inputs to other rungs in the ladder diagram.

The functionality of the PLC has evolved over time to include sequential relay control, motion control, process control, distributed control systems, and networking. Data handling, storage, processing power, and communication capabilities of some modern PLCs can be approximately equivalent to desktop computers. PLC-like programming combined with remote I/O hardware, allow a general-purpose desktop computer to overlap some PLCs in certain applications. Desktop computer controllers have not been generally accepted in heavy industry because desktop computers run on less stable operating systems than PLCs do, and because the desktop computer hardware is typically not designed to the same levels of tolerance to temperature, humidity, vibration, and longevity as the processors used in PLCs. Conventional personal computer operating systems, such as, e.g., but not limited to, MICROSOFT WINDOWS, e.g., do not lend themselves to deterministic logic execution, with the result that the controller may not always respond to changes of input status with the consistency in timing expected from PLCs. Desktop logic applications find use in less critical situations, such as laboratory automation and use in small facilities where the application is less demanding and critical, because they are generally much less expensive than PLCs. Personal computing devices, such as, e.g., but not limited to, the computer system described below with reference to FIG. 15, can be used for quality analysis, in some embodiments, as discussed below, and can interface with manufacturing line equipment and PLCs as discussed with reference to FIG. 16 below.

The most basic function of a Programmable logic controller (PLC) is to receive inputs from status components, which can be from sensors and/or switches and/or valves, and the like. Some of the basic components of a PLC can include, e.g., but not limited to, input modules, a central processing unit, output modules, and a programming device. When an input is activated, some output will also be activated by whatever the machine is told to do. Some examples of this are setting a timer to 10 ms, activating the timer and once 10 ms have passed a siren goes off. Some advantages to using a PLC over other programming devices are the user does not have to rewire anything, the PLC can require very little downtime in between running different programs, the user can program off-line, and PLCs are not time constrained. If the user tells the PLC to perform an output in 10 ms, it will perform the output in 10 ms, unlike other application programs, which can sometimes have a delay in activation.

The main function of a timer is to keep an output on for a specific length of time. A good example of this is a garage light, where you want power to be cut off after 2 minutes so as to give someone time to go into the house. The three different types of timers that are commonly used are a Delay-OFF, a Delay-ON, and a Delay-ON-Retentive. A Delay-OFF timer activates immediately when turned on, counts down from a programmed time before cutting off, and is cleared when the enabling input is off. A Delay-ON timer is activated by input and starts accumulating time, counts up to a programmed time before cutting off, and is cleared when the enabling input is turned off. A Delay-ON-Retentive timer is activated by input and starts accumulating time, retains the accumulated value even if the (ladder-logic) rung goes false, and can be reset only by a RESET contact.

Counters are primarily used for counting items such as cans going into a box on an assembly line. This is important because once something is filled to its max the item needs to be moved on so something else can be filled. Many companies use counters in PLC's to count boxes, count how many feet of something is covered, or to count how many pallets are on a truck. There are three types of counters, Up counters, Down counters, and Up/Down counters. Up counters count up to the preset value, turn on the CTU (CounT Up output) when the preset value is reached, and are cleared upon receiving a reset. Down counters count down from a preset value, turns on the CTD (CounT Down output) when 0 is reached, and are cleared upon reset. Up/Down counters count up on CU, count down on CD, turn on CTUD (CounT Up/Down output) when the preset value is reached, and cleared on reset.

PLCs are well adapted to a range of automation tasks. Such tasks typically include industrial processes in manufacturing where the cost of developing and maintaining the automation system is high relative to the total cost of the automation, and where changes to the system would be expected during its operational life. PLCs contain input and output devices compatible with industrial pilot devices and controls; little electrical design is required, and the design problem centers on expressing the desired sequence of operations. PLC applications are typically highly customized systems, so the cost of a packaged PLC is low compared to the cost of a specific custom-built controller design. On the other hand, in the case of mass-produced goods, customized control systems are economical. This is due to the lower cost of the components, which can be optimally chosen instead of a "generic" solution, and where the non-recurring engineering charges are spread over thousands or millions of units.

For high volume or very simple fixed automation tasks, different techniques are used. For example, a cheap consumer dishwasher would be controlled by an electromechanical cam timer costing only a few dollars in production quantities.

A microcontroller-based design would be appropriate where hundreds or thousands of units will be produced and so the development cost (design of power supplies, input/output hardware, and necessary testing and certification) can be spread over many sales, and where the end-user would not need to alter the control. Automotive applications are an example; millions of units are built each year, and very few end-users alter the programming of these controllers. However, some specialty vehicles such as transit buses economically use PLCs instead of custom-designed controls, because the volumes are low and the development cost would be uneconomical.

Very complex process control, such as used in the chemical industry, may require algorithms and performance beyond the capability of even high-performance PLCs. Very high-speed or precision controls may also require customized solutions; for example, aircraft flight controls. Single-board computers using semi-customized or fully proprietary hardware may be chosen for very demanding control applications where the high development and maintenance cost can be supported. "Soft PLCs" running on desktop-type computers can interface with industrial I/O hardware while executing programs within a version of commercial operating systems adapted for process control needs.

FIG. 15 depicts an exemplary computing device platform as may be used for any of various devices of the various systems disclosed herein.

An Exemplary Computer System Platform

For providing further understanding to assist in enabling the making and using of various exemplary embodiments of the claimed invention by a person having ordinary skill in the relevant art, certain computer analysis software and/or hardware platform equipment, which can be configured to provide an exemplary embodiment of computing system, which can be configured according to various exemplary embodiments to perform one or more functions including, receiving inputted data, and/or processing analysis of such inputted data, and/or providing output of such analyzed and processed data via one or more exemplary output devices capable of performing electronic automated computational analysis, including statistical algorithmic calculations.

FIG. 15 depicts an exemplary embodiment of a computer system 1500 that may be used in association with, in connection with, and/or in place of, but not limited to, computer platform 1616, 1607, 1609, 1608, 1630, 1628, 1604, 1612, 1622, etc. according to exemplary embodiments of the present invention.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1500 is shown in FIG. 15, depicting an exemplary embodiment of a block diagram of an exemplary computer system useful for implementing the present invention. Specifically, FIG. 15 illustrates an example computer 1500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., MAC/OS, MAC/OSX, IOS, etc. from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Indeed aspects of systems may include devices with various other input and/or output subsystems including, e.g., but not limited to, tablet displays, keyboards, various sensor(s), touch screen sensors, pressure sensors, location sensors (e.g., global positioning system (GPS), etc.), accelerometers, multi-dimensional sensor(s), temporal based datalogs, etc. Instead, the invention may be implemented on any appropriate computer system running any appropriate operating system. In one exemplary embodiment, the present invention may be implemented on a computer system operating as discussed herein. An exemplary computer system, computer 1500 is shown in FIG. 15. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, peer-to-peer devices, tablets, touch-enabled devices, sensor enabled devices, location sensing devices, convertible, table/laptop, mobile, smart devices, smart phones, phablets, wearable technology, watch devices, glass devices, routers, web servers, data, media, audio, video, telephony or streaming technology servers, etc., may also be implemented using a computer such as that shown in FIG. 15 and/or additional subsystems perhaps not all shown, as discussed.

The computer system 1500 may include one or more processors, such as, e.g., but not limited to, processor(s) 1504. The processor(s) 1504 may be connected to a communication infrastructure 1506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1500 may include a display interface 1502 that may forward, e.g., but not limited to, graphics, text, and other data, etc., from the communication infrastructure 1506 (or from a frame buffer, etc., not shown) for display on the display unit 1530.

The computer system 1500 may also include, e.g., but may not be limited to, a main memory 1508, random access memory (RAM), and/or a secondary memory 1510, etc. The secondary memory 1510 may include, for example, (but not limited to) a hard disk drive 1512, flash memory, a storage device, and/or a removable storage drive 1514, representing a floppy diskette drive, a magnetic tape drive, an optical disk drive, a compact disk drive CD-ROM, etc. The removable storage drive 1514 may, e.g., but not limited to, read from and/or write to a removable storage unit 1518 in a well known manner. Removable storage unit 1518, also called a program storage device or a computer program product, may represent, e.g., but not limited to, a floppy disk, magnetic tape, optical disk, compact disk, etc. which may be read from and written to by removable storage drive 1514. As will be appreciated, the removable storage unit 1518 may include a computer usable storage medium having stored therein computer software and/or data.

In alternative exemplary embodiments, secondary memory 1510 may include other similar devices for allowing computer programs or other instructions to be loaded into computer system 1500. Such devices may include, for example, an external storage unit 1522 (which may also be removable from the device) and an interface 1520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other external storage units 1522 and interfaces 1520, which may allow software and data to be transferred from the external storage unit 1522 to computer system 1500.

Computer 1500 may also include an input device such as, e.g., (but not limited to) a mouse or other pointing device such as a digitizer, and a keyboard or other data entry device (none of which are labeled).

Computer 1500 may also include output devices, such as, e.g., (but not limited to) display 1530, and display interface 1502. Computer 1500 may include input/output (IO) devices such as, e.g., (but not limited to) communications interface 1524, cable 1528 and communications path 1526, etc. These devices may include, e.g., but not limited to, a network interface card, and modems (neither are labeled). Communications interface 1524 may allow software and data to be transferred between computer system 1500 and external devices. Examples of communications interface 1524 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1524 may be in the form of signals 1528 which may be electronic, electromagnetic, optical or other signals capable of being received by communications interface 1524. These signals 1528 may be provided to communications interface 1524 via, e.g., but not limited to, a communications path 1526 (e.g., but not limited to, a channel). This channel 1526 may carry signals 1528, which may include, e.g., but not limited to, propagated signals, and may be implemented using, e.g., but not limited to, wire or cable, fiber optics, a telephone line, a cellular link, a radio frequency (RF) link and other communications channels, etc.

In this document, the terms "computer program medium" and "computer readable medium" may be used to generally refer to media such as, e.g., but not limited to removable storage drive 1514, a hard disk installed in hard disk drive 1512, and signals 1528, etc. These computer program products may provide software to computer system 1500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device, and/or a special purpose device programmed according to various algorithms and/or flowcharts and processes/methods as described at length herein.

Embodiments of the invention may be implemented in one or a combination of hardware, firmware, and software. Embodiments of the invention may also be implemented as instructions stored on a machine-readable medium, which may be read and executed by a computing platform, which may include one or more processors, such as, e.g., but not limited to, a microprocessor, a multi-core processor, a quad-core processor, a central processing unit (CPU), a quantum computer, a nanoprocessor, a computational engine, an information appliance, a virtual processor, a co-processor, a busmaster processor, a graphics processor (GPU), a digital signal processor (DSP), and/or other processor, to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical, magneto-optical, SD-RAM, SDCard, and/or other form of non-transitory medium storing any propagated signals (e.g., carrier waves, infrared signals, digital signals, etc.), and others.

Computer programs (also called computer control logic), may include object oriented computer programs, and may be stored in main memory 1508 and/or the secondary memory 1510 and/or removable storage units 1514, also called computer program products. Such computer programs, when executed, may enable the computer system 1500 to perform the features of the present invention as discussed herein. In particular, the computer programs, when executed, may enable the processor 1504 to provide a method to resolve conflicts during data synchronization according to an exemplary embodiment of the present invention. Accordingly, such computer programs may represent controllers of the computer system 1500.

In another exemplary embodiment, the invention may be directed to a computer program product comprising a computer readable medium having control logic (computer software) stored therein. The control logic, when executed by the processor 1504, may cause the processor 1504 to perform the functions of the invention as described herein. In another exemplary embodiment where the invention may be implemented using software, the software may be stored in a computer program product and loaded into computer system 1500 using, e.g., but not limited to, removable storage drive 1514, hard drive 1512 or communications interface 1524, etc. The control logic (software), when executed by the processor 1504, may cause the processor 1504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or nontransitory versions of other forms of previously propagated signals (e.g., carrier waves, infrared signals, digital signals, etc.), and others.

Still referring to FIG. 15, a universal integrated circuit card (UICC) (not shown) comprising a subscriber identity module and possibly a secure storage and/or cryptoprocessor can also coupled to the application or system processor. The system may further include a security processor (not shown) that may couple to the application or system processor or CPU.

One or more, or a plurality of sensors may couple to processor, or application processor to enable input of a variety of sensed information such as accelerometer and other environmental information. An audio, and/or video, output device may provide an interface to output sound, and/or other data, e.g., in the form of voice communications, played or streaming audio data and so forth.

As further illustration of FIG. 15, an exemplary near field communication (NFC) contactless interface can be provided in certain embodiments, that can communicate in a NFC near field via an NFC antenna, for example (not shown). While separate antennae can be used, not all are shown in FIG. 15 for simplicity of illustration, but will be apparent to those skilled in the relevant art, understand that in some implementations can include one or more antenna(ae) or a different set of antennae may be provided to enable various wireless functionality.

Further, an exemplary power management integrated circuit (PMIC) can couple to application processor, or system processor, to perform platform level power management. To this end, PMIC (not shown) may issue power management requests to application processor, system processor, etc., to enter certain low power states as desired. Furthermore, based on platform constraints, PMIC may also control the power level of other components of the exemplary system as shown in FIG. 15.

To enable communications to be transmitted and received, various circuitry may be coupled between an exemplary baseband or other system processor and/or an antenna (not necessarily shown in the block diagram). Specifically, a radio frequency (RF) transceiver and/or a wireless local area network (WLAN) transceiver, and/or a network interface card (NIC) may be present, in certain exemplary embodiments. In general, RF transceivers may be used to receive and transmit wireless data and calls according to a given wireless communication protocol such as, e.g., but not limited to, 3G, 4G, 5G, nG, next generation (NG), etc. wireless communication protocol such as in accordance with a code division multiple access (CDMA), global system for mobile communication (GSM), long term evolution (LTE) or other protocol. In addition a GPS sensor may be present in certain embodiments (not necessarily shown in block diagram). Other wireless and/or wired communications such as, e.g., but not limited to, receipt or transmission of radio signals, e.g., AM/FM, Wi-Fi, WiMAX, etc., and other signals may also be provided, on a local area, and/or a wide area basis. In addition, via an exemplary WLAN transceiver, local wireless communications can also be realized.

Further referring to FIG. 15, shown is a block diagram of another example system with which embodiments may be used. In the illustration of exemplary systems herein, some communications devices may be mobile, and/or portable, and/or, low-power system(s) such as, e.g., but not limited to, a tablet computer, 2:1 tablet, phablet, a smartphone, a laptop, a notebook, a portable computer, a personal computer, a telephony device, a cellphone, an ultrabook, a GOOGLE CHROME book, etc, a thick client, a fat client, a thin client, and/or convertible and/or standalone, and/or desktop and/or tablet system. As illustrated, a system on a chip (SoC) can also be used and may be configured to operate as a system processor, and/or an application processor for the device.

A variety of devices may couple to an exemplary SoC. In the illustration shown, a memory subsystem may include an exemplary flash memory and/or a DRAM coupled to a SoC, and/or processor and/or controller, and/or microcontroller. In addition, a touch panel 1320 is coupled to the SoC, etc. to provide display capability and/or user input via exemplary touch and/or other interface, including, e.g., but not limited to, provision of an actual, and/or virtual keyboard, and/or other input device, which can be alternatively displayed on an exemplary display of an exemplary touch enabled display panel monitor, or other output device or screen, according to exemplary embodiments.

To provide wired network connectivity, SoC or system processor can couple to an exemplary network interface such as, e.g., but not limited to, an exemplary Ethernet interface. A peripheral hub can be coupled to SoC or system processor, in some embodiments, to enable interfacing with various peripheral devices, such as may be coupled to system by any of various ports and/or other connectors. Various other output devices can include any of various indicators such as, e.g., but not limited to, display interfaces, LEDs, LCDs, etc., interfaces, command line interfaces, graphical user interfaces, etc.

In addition to internal power management circuitry and functionality optionally provided in some embodiments, within SoC or system processor, or a PMIC can be coupled to exemplary SoC or system processor embodiments to provide exemplary platform-based power management, e.g., based on whether the system is powered by a battery, or AC power, via an AC adapter, and/or uninterruptible power supply or other power source, in an exemplary embodiment. In addition to this power source-based power management, PMIC may further perform platform power management activities based on environmental and usage conditions in some embodiments. Still further, PMIC may communicate control and status information to SoC or system processor or controller to cause various power management actions within SoC or system processor, in exemplary embodiments.

Still referring to FIG. 15, to provide for exemplary communication functions, such as, e.g., but not limited to, wired capabilities, and/or wireless capabilities, a communication interface, such as, e.g., a WLAN unit can be coupled to SoC or system processor and/or in turn to an exemplary antenna. In various implementations, WLAN unit or other communications devices may provide for communication according to one or more wireless and/or wired communications protocols, as described herein, and as would be apparent to those skilled in the relevant art.

As further describing FIG. 15 in illustrative embodiments, a plurality of sensors (not shown) may couple to SoC and/or the system processor. These sensor(s) may include various accelerometer, environmental and other sensors, including, e.g., but not limited to, user gesture sensors, range finders, location based sensors, gyroscopic, touch, ultrasonic, and/or other well known sensors. Finally, an audio codec, and/or an analog to digital converter, and/or digital to analog converter, can be coupled to SoC or system processor to provide an interface to an exemplary audio input and/or output device. Of course, as will be understood to those skilled in the relevant art, such examples are intended merely as way of example, but not limitation, and that whether shown or not shown, discussed, or not discussed, are intended still to potentially fall with this particular implementations as described in the exemplary figures including FIG. 15, however many variations and alternatives are possible within the scope of the claims as set forth below.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G, 5G, 6G, n-G (any future wireless standard), next generation (NG), wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is a wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d, g, n, etc. such as, e.g., but not limited to, IEEE std. 802.11 a, b, d, g, n, (including, e.g., but not limited to IEEE 802.11g-2003, etc.), IEEE 802.16, Wi-MAX, etc.

Wide area networks (WANs) allow extending of computer networks over large distances, connecting or coupling remote branch offices to data centers and to other branch offices, and delivery of applications and services required to perform business functions. When entities like companies or government agencies extend networks over greater distances and sometimes across multiple carriers' networks, the entities can face operational challenges including, e.g., but not limited to, latency, network congestion, jitter, packet loss, and/or even service outages, etc. Modern communications related applications such as, e.g., but not limited to, voice over internet protocol (VoIP) calling, videoconferencing, streaming media, and/or virtualized applications and/or desktops, etc., can require low latency. Bandwidth requirements are also continually increasing, especially for applications featuring high-definition video, and the like. Expanding WAN capability can be expensive and difficult with corresponding difficulties related to network management and troubleshooting.

SD-WAN or SDWAN is an acronym for software-defined networking in a WAN. An SD-WAN simplifies the management and operation of a WAN by decoupling or separating networking hardware from a network control mechanism. SDWAN is similar to how software-defined networking implements virtualization technology to improve data center management and operation. SD-WAN enables building higher-performance WANs using lower-cost and commercially available Internet access, enabling businesses to partially or wholly replace more expensive private WAN connection technologies such as multiprotocol label switching (MPLS).

Exemplary Quality Testing Grading Device Dashboard for Exemplary Manufacturing Production Line Quality Analysis Manufacturers have long sought tools to help gather, manipulate and analyze data from its manufacturing processes. Such data can be useful in preventing costly breakdowns of the manufacturing equipment and can help prevent faulty products from being produced. Further, in relation to manufactured products that have to meet certain specifications before they can be sold, it is imperative for manufacturers to continually monitor produced products and the manufacturing process to ensure that the specifications are actually being met. As one can imagine, if a faulty manufacturing process or a malfunctioning piece of equipment goes undetected, then the manufacturer will have products that fail to meet the required specifications. Thus, the longer a faulty process or equipment remains undetected, the more resources, time and money is being wasted.

To address this concern, certain monitoring equipment and systems have been developed to gather data that can be useful in preventing such malfunctions from occurring. For example, programmable logic controllers ("PLCs") and client and/or server workstation devices (WS), which can serve as, e.g., but not limited to, human machine interfaces (HMIs) and/or machine to machine interfaces (MMI), have been developed to monitor and control manufacturing equipment and processes. A PLC can be programmed to monitor and control a specific measure (i.e. flow rate) of a manufacturing process. For example, if a manufacturing process requires a flow rate of an exemplary 10 gallons per minute of material, then the PLC can be programmed to continually monitor the flow rate of the process. In the event the flow rate ceases to meet this target 10 gallons per minute rate, the PLC can be programmed to make adjustments to bring the process back into compliance, and/or to provide alerts, electronic communications, and the like to assist in remediation and resolution. WSs can identify a computer system that can enable a user to view the data collected by the PLC and can enable the user to communicate with the PLC. Thus, in our example, if a user desires to decrease or increase a target flow rate, or actual flow rate, the user can use the WSs to instruct the PLC to do so. This data collected by the PLCs and WSs can usually be automatically stored in an exemplary database for a certain duration of time, and/or with timestamps allowing historical access and/or archival and data aggregation.

Manually collected data can also be collected by plant personnel. Plant personnel perform tests in labs and on plant floors to determine if the manufactured products meet the required specifications. The analysis of this data is also useful in determining if a manufacturing process is faulty and/or if manufacturing equipment is malfunctioning. Further, the analysis of this data can also help determine measures that can be taken to fix the process or equipment. This data is stored in a separate database from the PLC and WSs database.

If they have the proper tools, manufacturers can realize that the data collected by the PLCs and WSs can be analyzed in conjunction with the manually collected data from tests to determine if the products are meeting the desired specifications. Current methods use systems interfaces, redundant data entry and multiple user interfaces to analyze process, test and statistical data. Thus, vital information is not immediately accessible to the manufacturer's personnel in real time on the plant floor and cannot be used to immediately alert the plant personnel when the products do not meet the specifications. Thus, such a system and method are not useful in preventing the production of products not meeting the desired specification, because the system and method does not provide real time data to the plant personnel.

Thus, among other things, it is desired to have a system and method that generates real time views of information and eliminates the heavy reliance on information technology ("IT") personnel to build customized system for each plant facility. It is further desired to have a system and method that eliminates the multiple data entry points (i.e. the entry of PLC and WSs collected data in one database and the entry of test data into a separate database) and that can eliminate the use of multiple databases for the storing of manufacturing data (i.e., use of one database for the collection of PLC and WS data, use of another database for test data entry, and the use of a third or more databases for statistical processing). Moreover, it is desired to have a system and method that can easily and quickly be customized to any manufacturing plant and that enables plant personnel to configure customized views of the plant manufacturing process data It is also desired to have a system and method that can be tailored to focus on certain specifications of the product and that alerts the plant personnel in real time when manufacturing process is producing products that do not meet those specifications.

Figure 16:
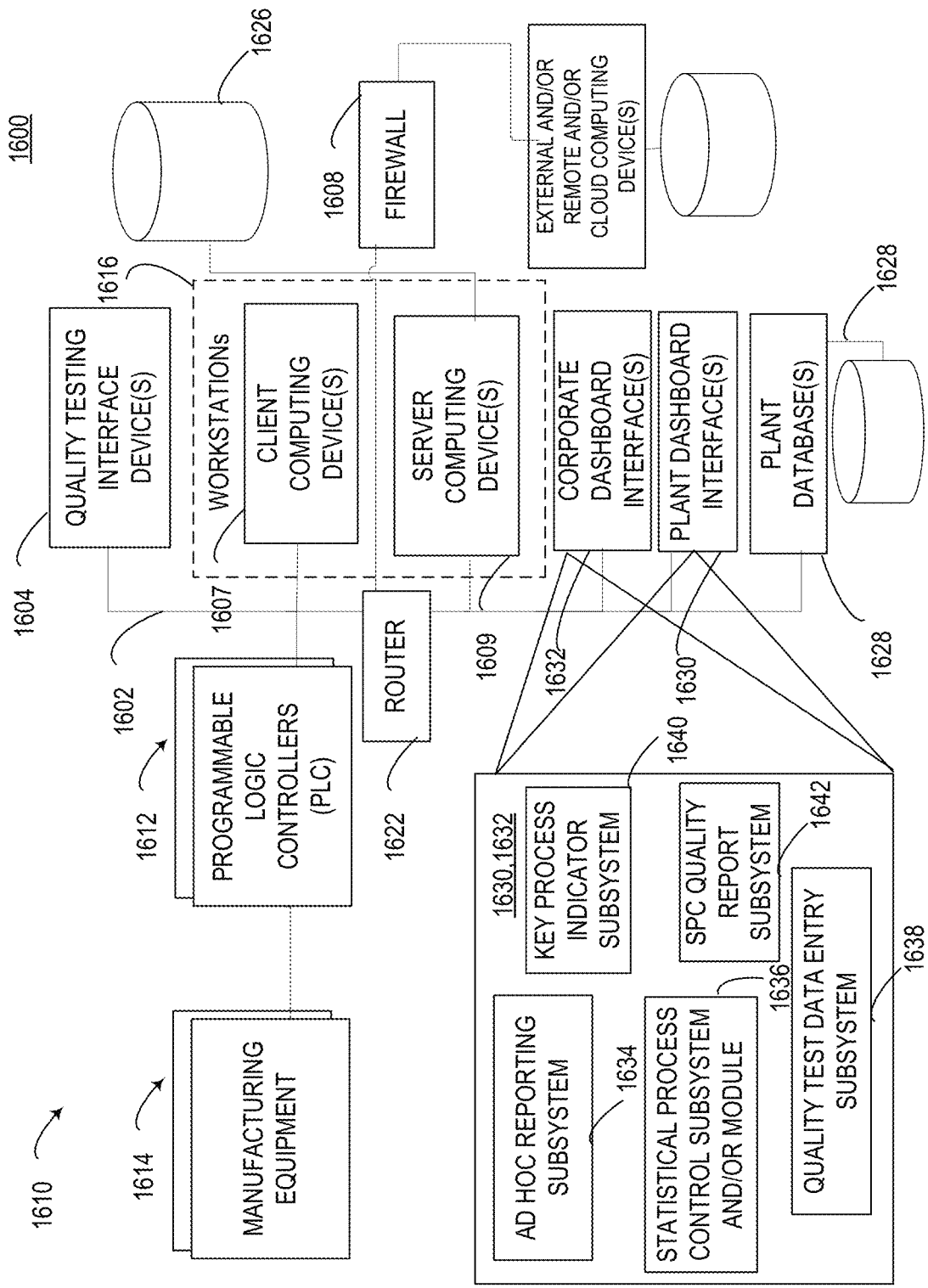
FIG. 16 depicts an exemplary diagram of an exemplary embodiment of a plant management system, according to one exemplary embodiment.

FIG. 16 shows a diagram 1600 of an exemplary embodiment of a plant management system 1610. In this embodiment, plant management system 1610 is utilized to manage and monitor several manufacturing sub-processes for the production of wallboard products. As shown in FIG. 16, the system 1610 has manufacturing equipment 1614 electronically and operatively connected to several programmable logic controllers (PLCs) 1612 by means well known in the art, (i.e., sensors and wires). PLCs 1612 can be programmed to measure and collect any type of data from the manufacturing equipment 1614 and the manufacturing sub-process being performed. For example, PLCs 1612 can be programmed to measure and collect line speeds, temperatures, feed rates, flow rates, pressure, density, moisture, machine speed, motor speed, weight, motor amps, viscosity, width, length, and caliper measurements. PLCs 1612 are electrically and/or operatively connected to, and/or coupled to, a bus of, or star wired ring of, or a series, or a parallel group of Work Stations (WSs) 1616 such as, e.g., but not limited to, client computing devices 1607, and/or server computing devices 1608 (and/or mobile devices, and/or mobile communications devices, and/or any of various other human machine interfaces (HMIs), collectively workstations) WSs 1616 and an exemplary plant database 1628 (such as, e.g., database 208, 302, etc.) by means well known in the art (i.e. cables 1618, wires, communications links, routers, gateways, network interface cards and the like, wireless transceiver communication via antennae, etc.). For an example workstation computing device, see FIG. 15 described above. WSs 1616 can comprise, e.g., a group, (and/or a series of, or a parallel group, or otherwise coupled via any of various well known network topologies) of computers connected to, and/or coupled to, one another in a network 1602. It will be appreciated that electrically and/or operatively connected or coupled, can include any number of means of connecting electronics together known in the art including, but not limited to, a wired network, a wireless network, an electronic network, any combination of a data, voice and/or cable TV (CATV) network, and/or electronic and/or optical device, routers, gateways, switches, etc., including, e.g., wireless communication access points/base stations, and/or interface equipment. Further, it will be appreciated that example plant database 1628 can comprise any type of database known in the art, including a relational database, and/or the like (e.g., hierarchical, flat file, graph database, etc.) and/or customized high speed storage database. These WSs 1616 allow users to monitor, control and/or collect data from PLCs 1612. Each of the PLCs 1612 and WSs 1616 monitor, measure and/or collect data relating to a specific and separate manufacturing sub-process that is being performed in the plant. The collected data is then transferred to and/or stored in plant database 1628. This stored data can then be used by users to relate an end-product to each stage of its manufacturing sub-process, according to an exemplary embodiment.

Still referring to FIG. 1, WSs 1616 can be connected and/or coupled (directly and/or indirectly) to, e.g., but not limited to, a firewall 1608 and/or a process information isolation switch 1620 (not shown) and/or a plant router 1622 (part of networking communications equipment in one embodiment) that can allow the plant to access both data local to the plant, as well as, data elsewhere, whether remote, or from other plants connected and/or coupled to the process information isolation switch. Plant router 1622 can be electronically and/or optically, mechanically, or otherwise, connected by, or coupled by, a hi-speed phone line, communications link, and/or communications line 1625, or other like means known in the art, to another communications gateway and/or router 1624 (and/or other local area network (LAN), and/or wide area network (WAN) and/or virtual private network (VPN) connection) that can allows a central repository, such as, e.g., but not limited to, a database 1626, 208, 302 at a corporate office, and/or other location or building, to store the data collected by all the PLCs 1612 and/or WSs 1616 in several different plants. Both the plant database 1628 and the corporate database 1626, 208, 302 can be electronically and/or optically, etc., connected and/or coupled to a plant dashboard 1630 and a corporate dashboard 1632, respectively. The exemplary dashboard user interface 1630, 1632 can reside on any type of computer, computing device, communications device, tablet, mobile device, notebook, laptop, and/or file server, cloud based system, webserver, application server, etc., and/or other device such as, e.g., but not limited to, a quality testing interface device 1604, and can act as an interface to the exemplary one or more database(s) 208, 302, 1628. In one embodiment, the dashboard 1630, 1632 can comprise a computing device including a hardware layer, operating system, and application layer which can include any of various application programs such as, e.g., but not limited to, a statistical analysis computational tool, such as, e.g., but not limited to, a MICROSOFT OFFICE EXCEL application program (available from MICROSOFT CORPORATION of Redmond, Wash. USA), and/or an add-in, applet, or the like, that can be coded to act as a dashboard, according to one exemplary embodiment. The plant dashboard 1630 can provide a system that can allow a user to view and/or analyze the data for a specific associated plant, according to one embodiment. The corporate dashboard 1632 can provide a system that can allow a user to view and/or analyze data for a specific plant and/or for a consolidated corporate view of multiple manufacturing facilities, according to one exemplary embodiment. While dashboards 1630 and 1632 can be located in different locations, the dashboards can be virtually identical and/or can be used primarily for the same purposes, according to one exemplary embodiment.

For ease of review by the reader, the detailed description of the dashboard 1630, 1632, as discussed herein, focuses on an exemplary embodiment of the plant dashboard 1630. However, it will be appreciated that this discussion is equally applicable to the corporate dashboard 1632. Focusing on the plant dashboard 1630, the dashboard can provide access to, e.g., but not limited to, an exemplary suite of features including, e.g., but not limited to, a configurable key process indicator dashboard ("KPI") 1640, an Ad Hoc Reporting subsystem 1634, a statistical process control subsystem ("SPC subsystem") with a statistical process control module ("SPC module") 1636, and a SPC Quality Report subsystem 1642. Further, the dashboard 1630 can be connected and/or coupled to a network with the plant database 1628 and a quality test data entry subsystem ("QTDE subsystem") 1638.

While various specific example embodiments have been illustrated and described herein to assist a person having ordinary skill in the relevant art to allow making and using the claimed inventions, numerous modifications come to mind without significantly departing from the spirit of the invention, and the scope of breadth of protection is only limited by the scope of the accompanying claims and their equivalents as set forth below.

What is claimed is:

1. A computer implemented manufacturing process quality and fault diagnosis method of electronically monitoring and measuring process stream quality data collected by at least one programmable logic controller (PLC) circuit configured to electronically monitor, and measure, yield data of at least one manufacturing process and automatically electronically computationally grade yield potential and yield performance and electronically display on an executive information system (EIS) dashboard configured to display at least one grading for at least one manufacturing process via an electronic decision support system comprising an electronic display and an interactive graphical user interface electronically displayed on the electronic display coupled to at least one electronic computer processor and at least one electronic memory device coupled to the at least one electronic computer processor, the at least one electronic computer processor coupled by at least one electronic router to the at least one programmable logic controller (PLC) circuit, the computer implemented manufacturing process quality and fault diagnosis method comprising:
  a) electronically receiving, by the at least one electronic computer processor, at least one quality characteristic measurement data about at least one manufacturing process stream, via at least one or more of:
    a. at least one electronic keyboard or other electronic input device; or
    b. at least one electronic sensor gauge; or
    c. the at least one programmable logic controller (PLC) circuit, comprising at least one automated electronic data acquisition sensor configured to operate without any user intervention;
  b) electronically time stamping, by the at least one electronic computer processor, said at least one quality characteristic measurement data about said at least one manufacturing process stream, comprising:
    a. electronically transforming, by the at least one electronic computer processor, said at least one quality characteristic data about said at least one manufacturing process stream into at least one time-stamped quality characteristic measurement data; and
    b. electronically storing, by the at least one electronic computer processor, said at least one time-stamped quality characteristic measurement data to the at least one memory device;
  c) electronically analyzing, by the at least one electronic computer processor, a plurality of said at least one time-stamped quality characteristic measurement data, comprising:
    a. electronically grading, by the at least one electronic computer processor, said plurality of said at least one time-stamped quality characteristic measurement data comprising electronically transforming said plurality into electronic data indicative of at least one grade,
      i. wherein said electronic data indicative of said at least one grade comprises electronic data indicative of at least two metrics,
        1. wherein said electronic data indicative of said at least two metrics comprise:
          a. electronic data indicative of a yield potential letter grade of the yield potential comprising one of:
            i. a high letter grade,
            ii. a moderate letter grade, or
            iii. a low letter grade; and
          b. electronic data indicative of a yield performance numeric grade of the yield performance comprising one of:
            i. a high numeric grade,
            ii. a moderate numeric grade, or
            iii. a low numeric grade;
    wherein said electronically grading of said electronic data indicative of said yield potential letter grade comprises:
      electronically comparing, by the at least one electronic computer processor electronic data indicative of a short-term standard deviation of said at least one manufacturing process streams, to electronic data indicative of an upper specification limit, and electronic data indicative of a lower specification limit;
    wherein said electronically grading said electronic data indicative of said yield performance numeric grade comprises:
      electronically calculating, by the at least one electronic computer processor, a ratio between electronic data indicative of an expected yield and electronic data indicative of a potential yield, and wherein electronic data indicative of said expected yield comprises:
      comparing, by the at least one electronic computer processor, electronic data indicative of a mean and electronic data indicative of a long-term standard deviation of said at least one manufacturing process stream, to electronic data indicative of an upper specification, and electronic data indicative of a lower specification; and
    electronically enabling, by the at least one electronic computer processor, interactive accessibility by a user through at least one triangular roll down roll up button graphical user interface (GUI) element of a stream analysis table grading dashboard graphical user interface (GUI) to said electronic data stored in at least one electronic database, according to at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through at least one level of stream grading information; and
  d) electronically displaying, by the at least one electronic computer processor, via the graphical user interface (GUI) electronically displayed on the electronic display said electronic data indicative of said at least one grade comprising said electronic data indicative of said at least two metrics, and
  electronically presenting as electronic output, by the at least one electronic computer processor, a grading matrix graphical user interface (GUI) element as an electronic presentation layer of electronic data indicative of nine grades,
  wherein said grading matrix graphical user interface element comprises:
    a 3×3 grid, and
    wherein a top of said 3×3 grid has columns labeled with numeric values across the top, and
    wherein a side of said 3×3 grid has rows labeled with letter values along the side, and
    wherein each cell in said 3×3 grid comprises electronic data indicative of a value of a number of said at least one manufacturing process streams, that are assigned to a corresponding letter and a corresponding numeric grade; and
  electronically displaying said electronic data indicative of said at least one level of said stream grading information, based upon said electronically enabling of said interactive accessibility through said at least one triangular roll down roll up button GUI element of said stream analysis table grading dashboard GUI, according to said at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through said at least one level of said stream grading information.

2. The computer implemented manufacturing process quality and fault diagnosis method according to claim 1, further comprising:
   e) electronically storing, by the at least one electronic computer processor, said at least one time-stamped quality characteristic measurement data into the at least one electronic database, wherein said at least one electronic database comprises at least one or more of:
      relational database;
      a hierarchical database;
      a flat file database;
      a graph database; or
      a cloud database; and
   f) electronically organizing, by the at least one electronic computer processor, said at least one time-stamped quality characteristic measurement data into at least one unique stream of said at least one manufacturing process streams, wherein said at least one unique stream of said at least one manufacturing process streams is electronically identified by electronic data indicative of at least three primary tags, wherein said electronic data indicative of said at least three primary tags comprise at least one or more of:
      a. electronic data indicative of a part tag,
      b. electronic data indicative of a process tag, or
      c. electronic data indicative of a feature tag.

3. The computer implemented manufacturing process quality and fault diagnosis method according to claim 2,
   wherein every 24 hours, an electronically summarizing engine comprises:
      automatically querying, by the at least one electronic computer processor, an entire system, and determining any new data that have been written to the at least one electronic database relating to said at least one manufacturing process streams; and
      electronically generating, by the at least one electronic computer processor, and electronically writing, by the at least one electronic computer processor, at least one summary record for each of said at least one unique of said at least one manufacturing process streams that was determined to contain said any new data, from the previous 24 hours.

4. The computer implemented manufacturing process quality and fault diagnosis method according to claim 3,
   wherein said electronically generating said at least one electronic summary record comprises:
      electronically computing electronic data indicative of a plurality of statistics comprising:
         automatically electronically calculating, by the at least one electronic computer processor of said electronically summarizing engine, one or more of at least one or more of:
         electronic data indicative of a piece count,
         electronic data indicative of a subgroup count,
         electronic data indicative of a mean,
         electronic data indicative of a standard deviation long-term, or
         electronic data indicative of a standard deviation short-term.

5. The computer implemented manufacturing process quality and fault diagnosis method according to claim 4, further comprising:
   an electronic stream grading engine method comprising:
      electronically using, by said at least one electronic computer processor, said plurality of statistics contained within said at least one electronic summary record comprising:
         electronically calculating, by said at least one electronic computer processor, a yield grade for each process stream.

6. The computer implemented manufacturing process quality and fault diagnosis method according to claim 1,
   wherein said electronically grading said yield potential letter grade comprises:
      wherein said high letter grade comprises an A,
      wherein said moderate letter grade comprises a B, and
      wherein said low letter grade comprises a C.

7. The computer implemented manufacturing process quality and fault diagnosis method according to claim 1, further comprises:
   wherein said electronically grading said yield performance numeric grade comprises:
      wherein said high numeric grade comprises a 1,
      wherein said moderate numeric grade comprises a 2, and
      wherein said low numeric grade comprises a 3.

8. The computer implemented manufacturing process quality and fault diagnosis method according to claim 1, further comprising:
   for each of said at least one manufacturing process streams, an electronically computed grade provides insight into how well said at least one manufacturing process is performing, as compared to a potential performance for said at least one manufacturing process.

9. The computer implemented manufacturing process quality and fault diagnosis method according to claim 5, further comprising:
   wherein the grading engine method comprises:
      electronically generating, by the at least one electronic computer processor, an overall grade for a physical manufacturing site.

10. The computer implemented manufacturing process quality and fault diagnosis method according to claim 1, comprising:
    wherein said electronically presenting as said electronic output, by the at least one electronic computer processor, said grading matrix graphical user interface element as the electronic presentation layer of said nine grades, wherein said grading matrix graphical user interface element comprises:
       said 3×3 grid, and
       wherein said top of said 3×3 grid has said columns labeled with said numeric values, wherein said numeric values comprise 123 across the top, and
       wherein said side of said 3×3 grid has said rows labeled with said letter values, wherein said letter values comprise ABC down a left or a right side.

11. The computer implemented manufacturing process quality and fault diagnosis method according to claim 10,
    wherein upon electronic receiving, by the at least one electronic computer processor, of input of a user selection of a number within a grade cell, within said grading matrix graphical user interface element, displaying a detailed list of said at least one manufacturing process streams that meet a grade associated with the received user selection.

12. The computer implemented manufacturing process quality and fault diagnosis method according to claim 1, further comprising:
   electronically presenting as electronic output, by the at least one electronic computer processor, an electronic site summary comprising an electronic presentation layer comprising:
      electronically displaying, by the at least one electronic computer processor, a two axis matrix graphical user interface element comprising a plurality of graphical user interface feature names across a top axis, and a plurality of graphical user interface site names down the left side axis, and wherein within each given cell of a plurality of cells of said two axis matrix graphical user interface element comprises a rolled up grade for an associated selected of said graphical user interface feature name and said graphical user interface site name combination, and wherein said each given cell of said plurality of cells is color-coded based on an associated grade represented in said each given cell.

13. The computer implemented manufacturing process quality and fault diagnosis method according to claim 12, wherein said method further comprises:
   electronically receiving, by the at least one electronic computer processor, an electronic user selection of a grade cell to view within said electronic site summary, and
   electronically displaying, by the at least one electronic computer processor, said grade cell of said electronic user selection comprising:
      electronically displaying a detailed list of a plurality of processes within said site of said grade cell of said electronic user selection that produced a given feature.

14. A manufacturing process quality and fault diagnosis system of electronically monitoring and measuring process stream quality data collected by at least one programmable logic controller (PLC) circuit configured to electronically monitor, and measure, yield data of at least one manufacturing process and automatically electronically computationally grade yield potential and yield performance and electronically display on an executive information system (EIS) dashboard configured to display at least one grading for at least one manufacturing process via an electronic decision support system comprising an electronic display and an interactive graphical user interface electronically displayed on the electronic display comprising:
   at least one electronic computer processor; and
   at least one electronic memory device coupled to the at least one electronic computer processor, and the at least one electronic computer processor configured to electronically display the electronic decision support system comprising the interactive graphical user interface electronically displayed on the electronic display;
   the at least one electronic computer processor configured to:
   a) electronically receive at least one quality characteristic measurement data about at least one manufacturing process stream, via at least one or more of:
      a. at least one electronic keyboard or other electronic input device; or
      b. at least one electronic sensor gauge; or
      c. the at least one programmable logic controller (PLC) circuit, comprising at least one automated electronic data acquisition sensor configured to operate without any user intervention;
   b) electronically time stamp said at least one quality characteristic measurement data about said at least one manufacturing process stream, comprising wherein the at least one electronic computer processor configured to:
      a. electronically transform said at least one quality characteristic data about said at least one manufacturing process stream into at least one time-stamped quality characteristic measurement data; and
      b. electronically store said at least one time-stamped quality characteristic measurement data to the at least one electronic memory device;
   c) electronically analyze a plurality of said at least one time-stamped quality characteristic measurement data, comprising wherein the at least one electronic computer processor configured to:
      a. electronically grade said plurality of said at least one time-stamped quality characteristic measurement data comprising wherein the at least one electronic computer processor configured to electronically transform said plurality into electronic data indicative of at least one grade,
         i. wherein said electronic data indicative of said at least one grade comprises electronic data indicative of at least two metrics,
            1. Wherein said electronic data indicative of at least two metrics comprise:
               a. electronic data indicative of a yield potential letter grade of the yield potential comprising one of:
                  i. a high letter grade,
                  ii. a moderate letter grade, or
                  iii. a low letter grade; and
               b. electronic data indicative of a yield performance numeric grade of the yield performance comprising one of:
                  i. a high numeric grade,
                  ii. a moderate numeric grade, or
                  i. a low numeric grade;
         wherein said electronically grade of said electronic data indicative of said yield potential letter grade comprises:
            electronically compare electronic data indicative of a short-term standard deviation of said at least one manufacturing process streams, to electronic data indicative of an upper specification limit, and electronic data indicative of a lower specification limit;
         wherein said electronically grade said electronic data indicative of said yield performance numeric grade comprises:
            electronically calculate a ratio between electronic data indicative of an expected yield and electronic data indicative of a potential yield, and
         wherein said electronic data indicative of said expected yield comprises:
            compare electronic data indicative of a mean and electronic data indicative of a long-term standard deviation of said at least one manufacturing process stream, to electronic data indicative of an upper specification, and electronic data indicative of a lower specification; and iii. electronically enable interactive accessibility by a user through at least one triangular roll down roll up button graphical user interface (GUI) element of a stream analysis table grading dashboard graphical user interface (GUI) to said electronic data stored in at least one electronic database, according to at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through at least one level of stream grading information; and g) electronically display via the graphical user interface (GUI) electronically displayed on the electronic display said electronic data indicative of said at least one grade comprising said electronic data indicative of said at least two metrics, and electronically present as electronic output a grading matrix graphical user interface (GUI) element as an electronic presentation layer of electronic data indicative of nine grades, wherein said grading matrix graphical user interface element comprises:

a 3×3 grid, and wherein a top of said 3×3 grid has columns labeled with numeric values across the top, and wherein a side of said 3×3 grid has rows labeled with letter values along the side, and wherein each cell in said 3×3 grid comprises electronic data indicative of a value of a number of said at least one manufacturing process streams, that are assigned to a corresponding letter and a corresponding numeric grade; and d) electronically display said electronic data indicative of said at least one level of said stream grading information, based upon said electronically enable of said interactive accessibility through said at least one triangular roll down roll up button GUI element of said stream analysis table grading dashboard GUI, according to said at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through said at least one level of said stream grading information.

15. A nontransitory computer accessible medium having program logic thereon, which when executed on at least one electronic computer processor executes a computer implemented manufacturing process quality and fault diagnosis method of electronically monitoring and measuring process stream quality data collected by at least one programmable logic controller (PLC) circuit configured to electronically monitor, and measure, yield data of at least one manufacturing process and automatically electronically computationally grade yield potential and yield performance and electronically display on an executive information system (EIS) dashboard configured to display at least one grading for at least one manufacturing process via an electronic decision support system comprising an electronic display and an interactive graphical user interface electronically displayed on the electronic display coupled to the at least one electronic computer processor and at least one electronic memory device coupled to the at least one electronic computer processor, the at least one electronic computer processor coupled by at least one electronic router to the at least one programmable logic controller (PLC) circuit, the computer implemented manufacturing process quality and fault diagnosis method comprising:

a) electronically receiving, by the at least one electronic computer processor, at least one quality characteristic measurement data about at least one manufacturing process stream, via at least one or more of:
 a. at least one electronic keyboard or other electronic input device; or
 b. at least one electronic sensor gauge; or
 c. the at least one programmable logic controller (PLC) circuit, comprising at least one automated electronic data acquisition sensor configured to operate without any user intervention;

b) electronically time stamping, by the at least one electronic computer processor, said at least one quality characteristic measurement data, comprising:
 a. electronically transforming, by the at least one electronic computer processor, said at least one quality characteristic data into at least one time-stamped quality characteristic measurement data; and
 b. electronically storing, by the at least one electronic computer processor, said at least one time-stamped quality characteristic measurement data to the at least one memory device;

c) electronically analyzing, by the at least one electronic computer processor, a plurality of said at least one time-stamped quality characteristic measurement data, comprising:
 a. electronically grading, by the at least one computer processor, said plurality of said at least one time-stamped quality characteristic measurement data comprising electronically transforming said plurality into electronic data indicative of at least one grade,
  i. wherein said electronic data indicative of said at least one grade comprises electronic data indicative of at least two metrics,
   1. Wherein said electronic data indicative of said at least two metrics comprise:
    a. electronic data indicative of a yield potential letter grade of the yield potential comprising one of:
     i. a high letter grade,
     ii. a moderate letter grade, or
     iii. a low letter grade; and
    b. electronic data indicative of said a yield performance numeric grade of the yield performance comprising one of:
     i. a high numeric grade,
     ii. a moderate numeric grade, or
     iii. a low numeric grade;

wherein said electronically grading of said electronic data indicative of said yield potential letter grade comprises:
 electronically comparing, by the at least one electronic computer processor electronic data indicative of a short-term standard deviation of said at least one manufacturing process streams, to electronic data indicative of an upper specification limit, and electronic data indicative of a lower specification limit;

wherein said electronically grading said electronic data indicative of said yield performance numeric grade comprises:
electronically calculating, by the at least one electronic computer processor, a ratio between electronic data indicative of an expected yield and electronic data indicative of a potential yield, and
wherein electronic data indicative of said expected yield comprises:
comparing, by the at least one electronic computer processor, electronic data indicative of a mean and electronic data indicative of a long-term standard deviation of said at least one manufacturing process stream, to electronic data indicative of an upper specification, and electronic data indicative of a lower specification; and
electronically enabling, by the at least one electronic computer processor, interactive accessibility by a user through at least one triangular roll down roll up button graphical user interface (GUI) element of a stream analysis table grading dashboard graphical user interface (GUI) to said electronic data stored in at least one electronic database, according to at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through at least one level of stream grading information; and
h) electronically displaying, by the at least one electronic computer processor, via the graphical user interface (GUI) electronically displayed on the electronic display said electronic data indicative of said at least one grade comprising said electronic data indicative of said at least two metrics, and
electronically presenting as electronic output, by the at least one electronic computer processor, a grading matrix graphical user interface (GUI) element as an electronic presentation layer of electronic data indicative of nine grades,
wherein said grading matrix graphical user interface element comprises:
a 3×3 grid, and
wherein a top of said 3×3 grid has columns labeled with numeric values across the top, and
wherein a side of said 3×3 grid has rows labeled with letter values along the side, and
wherein each cell in said 3×3 grid comprises a value of a number of said at least one manufacturing process streams, that are assigned to a corresponding letter and a corresponding numeric grade; and
electronically displaying said electronic data indicative of said at least one level of said stream grading information, based upon said electronically enabling of said interactive accessibility through said at least one triangular roll down roll up button GUI element of said stream analysis table grading dashboard GUI, according to said at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through said at least one level of said stream grading information.

16. The computer implemented manufacturing process quality and fault diagnosis method according to claim 1, wherein said at least one manufacturing process stream comprises electronically stored data relating to at least one or more of:
at least one unique part of said manufacturing process stream;
at least one process of said manufacturing process stream; or
at least one product feature of said manufacturing process stream.

17. The computer implemented manufacturing process quality and fault diagnosis method according to claim 1, further comprising:
wherein said electronic data indicative of said yield potential letter grade comprises:
wherein said high letter grade comprises a tight distribution having a narrower spread than a specification;
wherein said moderate letter grade comprises a distribution similar to a specification; and
wherein said low letter grade comprises a broad distribution having a broader spread than a specification; and
wherein said electronic data indicative of said yield performance numeric grade comprises:
wherein said high numeric grade comprises wherein a center of a distribution is on target;
wherein said moderate numeric grade comprises wherein a center of a distribution is off target by a degree; and
wherein said low numeric grade comprises wherein a center of a distribution is off target by a substantial degree.

18. The computer implemented manufacturing process quality and fault diagnosis method according to claim 17, wherein said specification comprises:
upper and lower engineering tolerance limits.

19. The computer implemented manufacturing process quality and fault diagnosis method according to claim 1, wherein said (a) of said electronically receiving comprises using at least one or more of:
1. Electronically monitoring at least one or more of:
A. a programmable logic controller (PLC);
B. a workstation device (WS);
C. a client workstation (CWS);
D. a server workstation (SWS);
E. a human machine interface (HMI); or
F. a machine to machine (MMI).

20. The computer implemented manufacturing process quality and fault diagnosis method according to claim 1, wherein said electronically enabling said interactive accessibility by the user through at least one triangular roll down roll up button GUI element of said stream analysis table grading dashboard GUI element through said at least one level of stream grading information, comprises electronically receiving a given of said at least one stream grade to drill down into at least one or more of:
at least one location associated with at least one stream;
at least one site associated with at least one stream;
at least one subsite associated with at least one stream;
at least one stream information metric associated with at least one stream;

at least one category of at least one stream information metric associated with at least one stream;

at least one subcategory of at least one category of at least one stream information metric associated with at least one stream;

at least one product associated with at least one stream;

at least one part associated with at least one stream;

at least one process associated with at least one stream;

at least one sub-process of at least one process; or at least one feature associated with at least one stream; and wherein said electronically displaying said given of said at least one stream grade comprises being drilled down into said at least one or more of:

said at least one location associated with said at least one stream;

said at least one site associated with said at least one stream;

said at least one subsite associated with said at least one stream;

said at least one stream information metric associated with said at least one stream;

said at least one category of said at least one stream information metric associated with said at least one stream;

said at least one subcategory of said at least one category of said at least one stream information metric associated with said at least one stream;

said at least one product associated with said at least one stream;

said at least one part associated with said at least one stream;

said at least one process associated with said at least one stream;

said at least one sub-process of said at least one process; or said at least one feature associated with said at least one stream.

21. The computer implemented manufacturing process quality and fault diagnosis method according to claim 1, wherein said electronically enabling a user to interactively access through at least one triangular roll down roll up button GUI element comprises at least one or more of:

receiving at least one user selection of at least one triangular roll down roll up button GUI element of said grading matrix GUI element; and at least one or more of:

displaying at least one stream details table GUI element in response to said receiving said at least one user selection, wherein said at least one stream details table GUI element comprises for each stream, at least one part, at least process, at least one feature, at least one piece count, at least one letter grade and at least one number grade, and at least one yield potential grade and at least one yield potential percentage, and at least one yield performance grade and at least one yield performance percentage;

displaying at least one stream information table with actionable metrics comprising at least one category or at least one subcategory, and for each of said at least one category or at least one subcategory, at least one product stream, and for at least one product stream, at least one product type manufactured on the at least one product stream, and for each one product stream, at least one or more of: a piece count, a grade, a yield potential grade, a yield performance grade, or an expected yield;

displaying an hierarchically roll down expandable drill down dashboard of a plurality of product streams;

displaying guidance of what type of effort might be helpful to improve a product stream;

displaying interactively accessible summary data from all production lines and sites;

displaying interactively accessible summary results with GUI element color coding; or allowing interactive drilling down from site data to specific data streams.

22. A computer implemented manufacturing process quality and fault diagnosis method of electronically monitoring and measuring process stream quality data collected by at least one programmable logic controller (PLC) circuit configured to electronically monitor, and measure, yield data of at least one manufacturing process and automatically electronically computationally grade yield potential and yield performance and electronically display on an executive information system (EIS) dashboard configured to display at least one grading for at least one manufacturing process via an electronic decision support system comprising an electronic display and an interactive graphical user interface electronically displayed on the electronic display coupled to at least one electronic computer processor and at least one electronic memory device coupled to the at least one electronic computer processor, the at least one electronic computer processor coupled by at least one electronic router to the at least one programmable logic controller (PLC) circuit, the computer implemented manufacturing process quality and fault diagnosis method comprising:

a) electronically receiving, by the at least one electronic computer processor, at least one quality characteristic measurement data about at least one manufacturing process stream, via at least one or more of:

a. at least one electronic keyboard or other electronic input device; or b. at least one electronic sensor gauge; or c. the at least one programmable logic controller (PLC) circuit, comprising at least one automated electronic data acquisition sensor configured to operate without any user intervention;

b) electronically analyzing, by the at least one electronic computer processor, a plurality of said at least one quality characteristic measurement data, comprising:

a. electronically grading, by the at least one electronic computer processor, said plurality of said at least one quality characteristic measurement data comprising electronically transforming said plurality into electronic data indicative of at least one grade, i. wherein said electronic data indicative of said at least one grade comprises electronic data indicative of at least two metrics, 1. Wherein said electronic data indicative of said at least two metrics comprise:

a. electronic data indicative of a yield potential letter grade of the yield potential comprising one of:

i. a high letter grade, ii. a moderate letter grade, or iii. a low letter grade; and b. electronic data indicative of a yield performance numeric grade of the yield performance comprising one of:

i. a high numeric grade, ii. a moderate numeric grade, or iii. a low numeric grade;

wherein said electronically grading of said electronic data indicative of said yield potential letter grade comprises:

electronically comparing, by the at least one electronic computer processor electronic data indicative of a short-term standard deviation of said at least one manufacturing process streams, to electronic data indicative of an upper specification limit, and electronic data indicative of a lower specification limit;

wherein said electronically grading said electronic data indicative of said yield performance numeric grade comprises:

electronically calculating, by the at least one electronic computer processor, a ratio between electronic data indicative of an expected yield and electronic data indicative of a potential yield, and wherein electronic data indicative of said expected yield comprises:

comparing, by the at least one electronic computer processor, electronic data indicative of a mean and electronic data indicative of a long-term standard deviation of said at least one manufacturing process stream, to electronic data indicative of an upper specification, and electronic data indicative of a lower specification; and electronically enabling, by the at least one electronic computer processor, interactive accessibility by a user through at least one triangular roll down roll up button graphical user interface (GUI) element of a stream analysis table grading dashboard graphical user interface (GUI) to said electronic data stored in at least one electronic database, according to at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through at least one level of stream grading information; and c) electronically displaying, by the at least one electronic computer processor, via the graphical user interface (GUI) electronically displayed on the electronic display said electronic data indicative of said at least one grade comprising said electronic data indicative of said at least two metrics, and electronically presenting as electronic output, by the at least one electronic computer processor, a grading graphical user interface (GUI) element comprising:

d) electronically displaying said electronic data indicative of said at least one level of said stream grading information, based upon said electronically enabling of said drill down accessibility through said at least one triangular roll down roll up button GUI element of said stream analysis table grading dashboard GUI, according to said at least one received user selection of said at least one triangular roll down roll up button GUI element of said stream analysis table grading dashboard GUI, wherein said at least one triangular roll down roll up button GUI element is configured to roll down a given process row into at least one sub process row by accessing said electronic data stored in said at least one electronic database, through said at least one level of said stream grading information.

\* \* \* \* \*